METERING APPARATUS

Original Filed Nov. 14, 1960 14 Sheets-Sheet 1

INVENTORS
ARTHUR J. GRINER
ROBERT J. ALBRECHT
BY Herbert J. Evers
ATTORNEY

March 5, 1968 A. J. GRINER ET AL Re. 26,357

METERING APPARATUS

Original Filed Nov. 14, 1960 14 Sheets-Sheet 8

INVENTORS
ARTHUR J. GRINER
ROBERT J. ALBRECHT

BY Herbert J. Evers
ATTORNEY

March 5, 1968

A. J. GRINER ET AL

METERING APPARATUS

Re. 26,357

14 Sheets-Sheet 3

Original Filed Nov. 14, 1960

INVENTORS
ARTHUR J. GRINER
ROBERT J. ALBRECHT
BY Herbert J. Evers
ATTORNEY

March 5, 1968

A. J. GRINER ET AL

METERING APPARATUS

Re. 26,357

14 Sheets-Sheet 4

Original Filed Nov. 14, 1960

INVENTORS
ARTHUR J. GRINER
ROBERT J. ALBRECHT
BY Herbert J. Evers
ATTORNEY

METERING APPARATUS

Original Filed Nov. 14, 1960 14 Sheets-Sheet 5

INVENTORS
ARTHUR J. GRINER
ROBERT J. ALBRECHT
BY Herbert J. Evers
ATTORNEY

METERING APPARATUS

Original Filed Nov. 14, 1960 14 Sheets-Sheet 6

INVENTORS
ARTHUR J. GRINER
ROBERT J. ALBRECHT
BY
Herbert J. Evers
ATTORNEY

METERING APPARATUS

Original Filed Nov. 14, 1960 14 Sheets-Sheet 7

INVENTORS
ARTHUR J. GRINER
ROBERT J. ALBRECHT
BY Herbert J. Evers
ATTORNEY

METERING APPARATUS
Original Filed Nov. 14. 1960 14 Sheets-Sheet 8
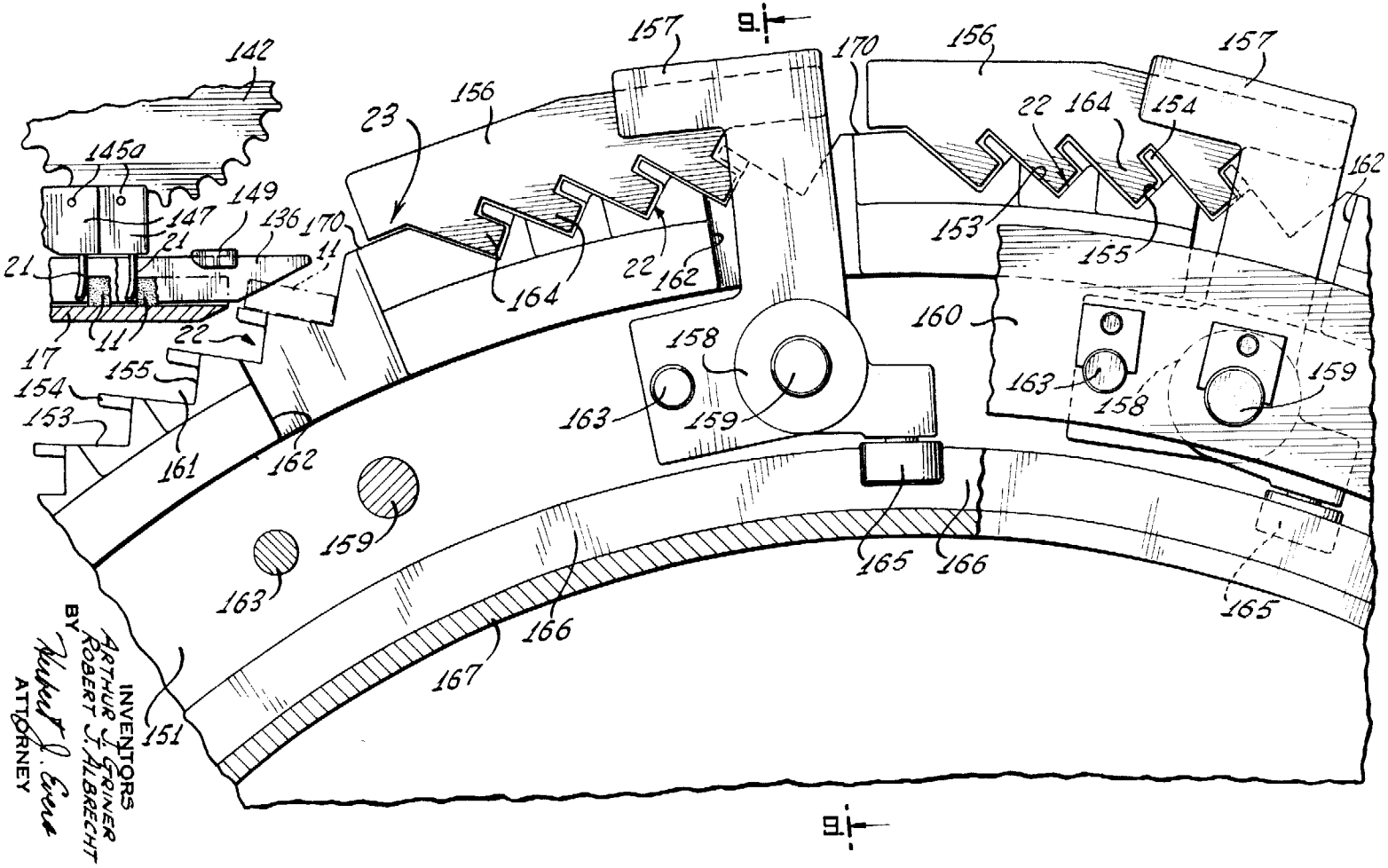
INVENTORS
ARTHUR J. GRINER
ROBERT J. ALBRECHT
BY Herbert J. Evers
ATTORNEY

METERING APPARATUS

Original Filed Nov. 14, 1960 14 Sheets-Sheet 9

INVENTORS
ARTHUR J. GRINER
ROBERT J. ALBRECHT
BY Herbert J. Evers
ATTORNEY

INVENTORS
ARTHUR J. GRINER
ROBERT J. ALBRECHT
BY Herbert J. Evers
ATTORNEY

METERING APPARATUS
Original Filed Nov. 14, 1960 14 Sheets-Sheet 11
Fig. 12.
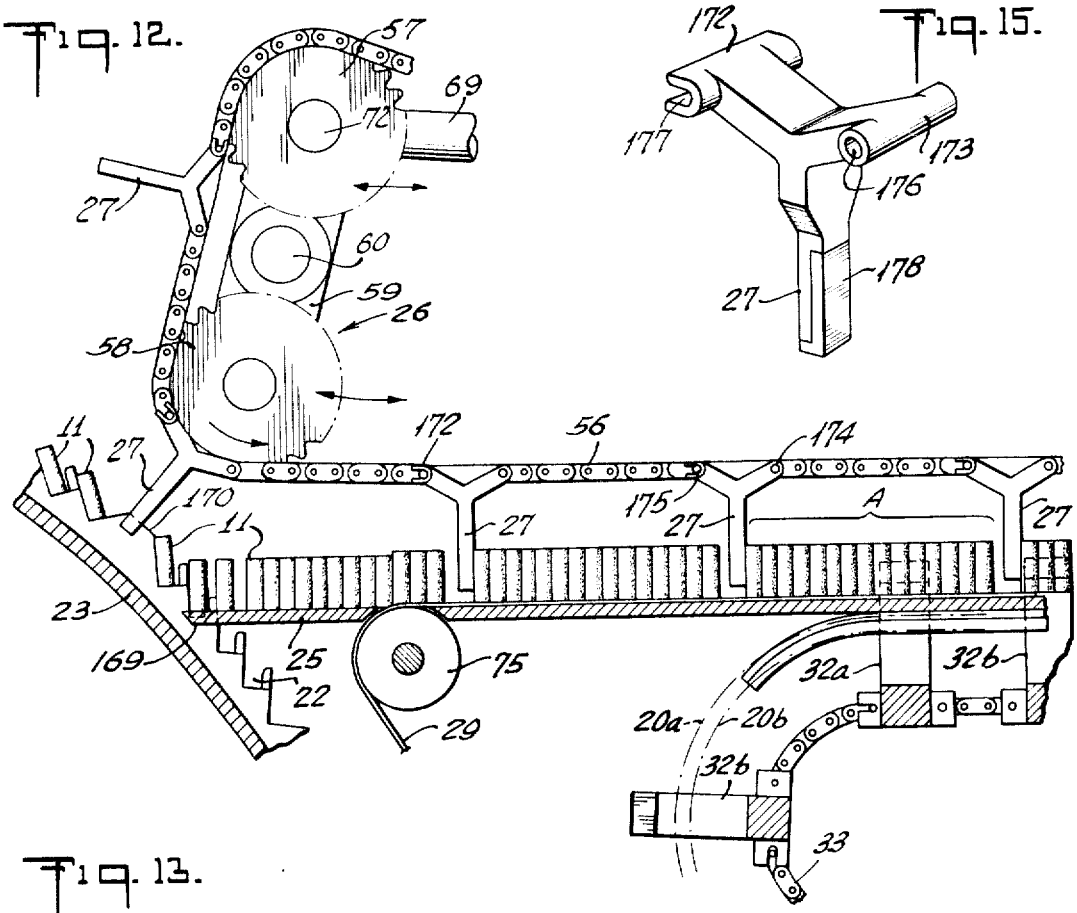
Fig. 15.
Fig. 13.
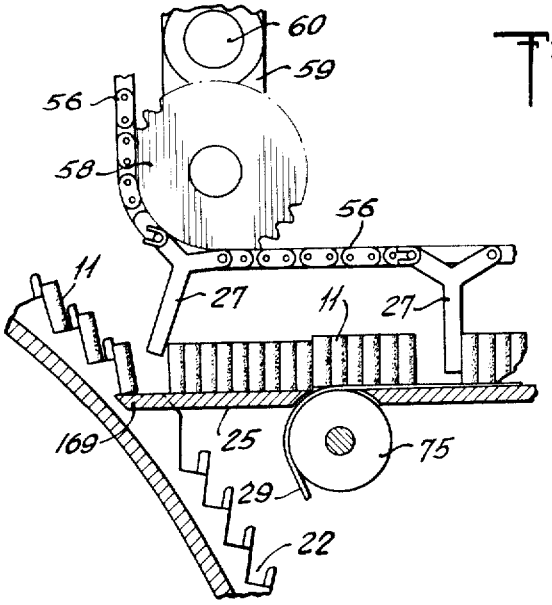
Fig. 14.
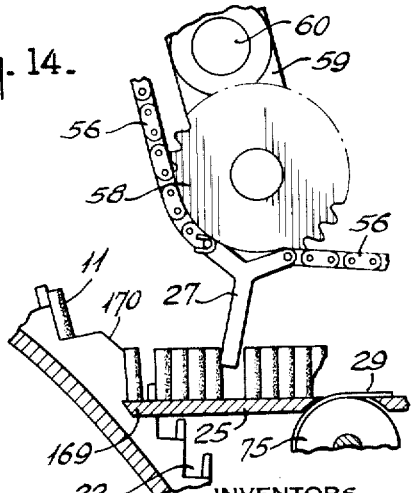
INVENTORS
ARTHUR J. GRINER
ROBERT J. ALBRECHT
BY Herbert J. Evans
ATTORNEY METERING APPARATUS
Original Filed Nov. 14, 1960 14 Sheets-Sheet 12
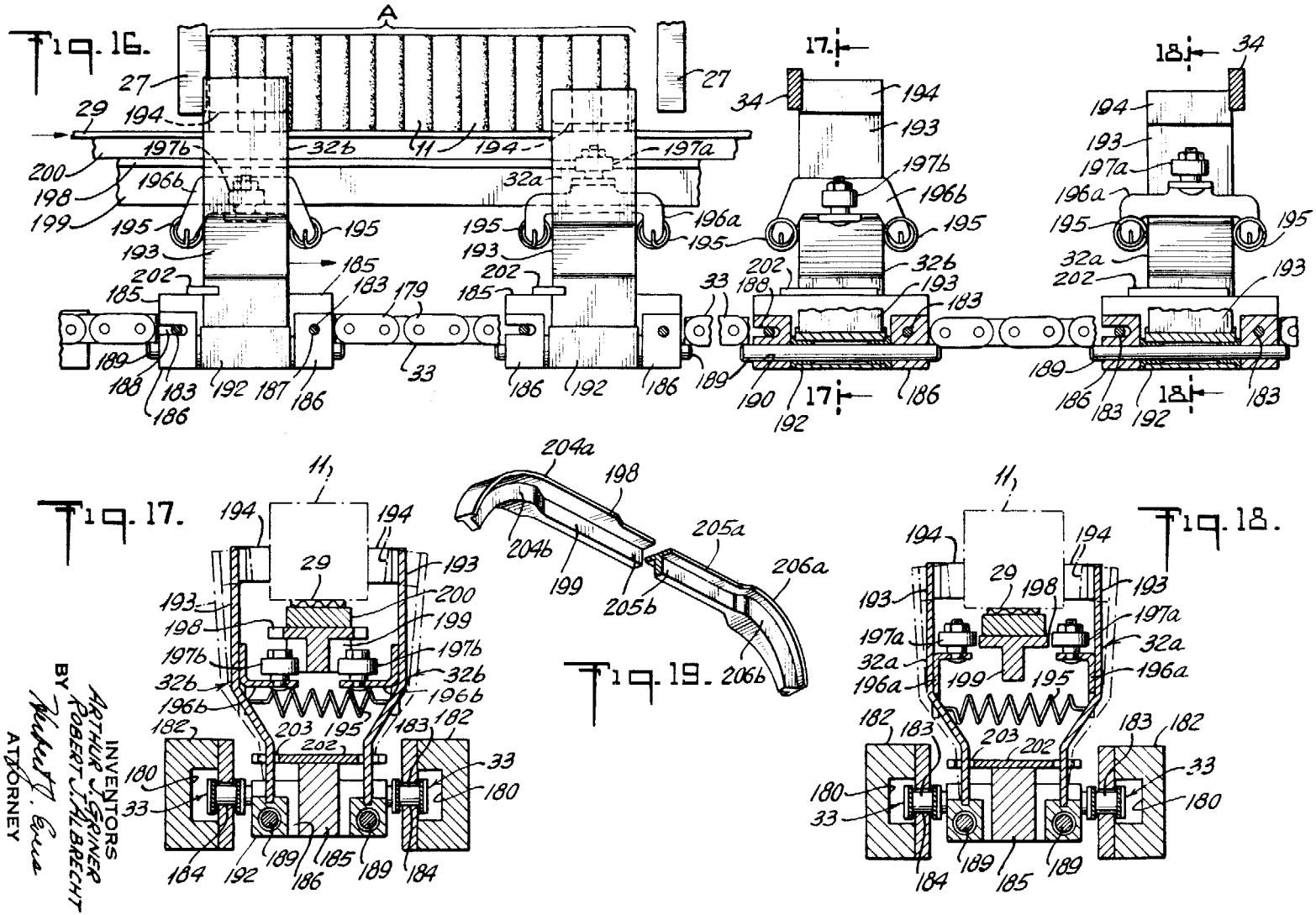
INVENTORS
ARTHUR J. GRINER
ROBERT J. ALBRECHT
BY Herbert J. Cross
ATTORNEY

METERING APPARATUS

Original Filed Nov. 14. 1960 14 Sheets-Sheet 13

INVENTORS
ARTHUR J. GRINER
ROBERT J. ALBRECHT
BY Herbert J. Evers
ATTORNEY

METERING APPARATUS

Original Filed Nov. 14, 1960 14 Sheets-Sheet 14

INVENTORS
ARTHUR J. GRINER
ROBERT J. ALBRECHT
BY Herbert J. Evers
ATTORNEY

United States Patent Office

Re. 26,357
Reissued Mar. 5, 1968

26,357
METERING APPARATUS

Arthur J. Griner, Wyckoff, and Robert J. Albrecht, River Edge, N.J., assignors to National Biscuit Company, a corporation of New Jersey Original No. 3,086,334, dated Apr. 23, 1963, Ser. No. 68,928, Nov. 14, 1960. Application for reissue Feb. 26, 1964, Ser. No. 377,147
41 Claims. (Cl. 53—26)

Matter enclosed in heavy brackets [ ] appears in the original patent but forms no part of this reissue specification; matter printed in italics indicates the additions made by reissue.

*ABSTRACT OF THE DISCLOSURE*

*Method and apparatus for automatically handling articles, such as fig bars and similar baked goods, wherein the lead articles are stripped one at a time from each of a plurality of columns or stacks in rotation, formed into rows of spaced articles in staggered relation, and then consolidated into a single column of articles on a rotating drum. The resulting column is successively stripped from the drum with the articles in stacked-on-edge, close-column relation, mechanically metered into spaced groups of equal numbers of articles, and conveyed to continuous packaging apparatus.*

The present invention relates to improved means for metering an accurate number of articles, and more particularly pertains to an apparatus and method for automatically, continuously metering baked goods after they are discharged from the oven.

Much time and expense are involved today in handling and metering baked goods into groups of packageable units, commonly referred to in the trade as "slugs." Baked goods themselves are fragile and careful handling of them requires time. The prior art has long appreciated the need for means of accurately metering an exact number of baked goods to a package. Without such means there is always the possibility of having either an insufficient number or an excess of baked goods in the package. One of the fundamental difficulties involved in metering baked goods, such as cookies, biscuits or crackers, in just the correct amount is the variation in the thickness of these items which occurs during the course of production. The inability of the art to meet this problem has impeded the development of improved metering means. With the development of increased means of production it has become more and more desirable to have available improved means of accurately metering a pre-determined quantity of baked goods.

It is therefore a principal object of the present invention to provide automatic means and method of metering articles flowing along a conveying line.

Another object of the invention is to provide in the delivery of a number of rows of articles along an assembly line, improved means for delivering the articles in a single line preparatory to metering.

Another object of the invention is to provide in the delivery of articles along an assembly line, improved means for automatically, continuously segregating and metering a pre-determined number of articles in stacked on-edge condition which is independent of the variation in thickness of the articles.

Another object of the invention is to provide a feeder or transfer mechanism for supplying successive groups of articles to a rotary station in which the individual articles comprising each group are positively charged into said feeder mechanism in staggered relation to each other and maintained in staggered relation until deposited on said rotary station.

Another object of the invention is to provide a rotary stacker wheel having a plurality of peripheral pockets adapted to receive from a feeder mechanism successive groups of articles in which the individual articles are respectively individually fed and engaged in said pockets in staggered order, and means for laterally moving each group of articles in said pockets in a direction transverse to the direction of rotation into linear alignment while said stacker wheel rotates.

Yet another object of the present invention is to provide in the handling of a metered amount of articles in stacked on-edge condition, improved means for maintaining said articles in said stacked on-edge relationship while wrapping said metered articles in a packaging material.

Other objects, features and advantages of the present invention will be apparent to those skilled in the art from the following detailed description of a preferred embodiment thereof taken in conjunction with the following drawings, in which:

FIG. 1B is a continuation of the apparatus shown in FIG. 1A starting with the stacker wheel 23 shown in dotted outline and continuing to the end gripper assembly 35;

FIG. 8 is an enlarged side elevational view, partly in section, of a portion of the stacker wheel shown in FIG. 2B with parts broken away to show underlying parts;

FIG. 12 is an enlarged side elevational view of a portion of the oscillating finger assembly located in FIG. 2C, showing the sprocket 58 in the extreme rear position;

FIG. 13 is a side elevational view similar to FIG. 12, showing the sprocket 58 in an intermediate position;

FIG. 14 is a view similar to FIG. 12 showing the oscillating arm in a forward position;

FIG. 15 is a perspective view showing the details of the finger 27 of the oscillating finger assembly shown in FIGS. 12 to 14;

FIG. 16 is an enlarged side elevational view of a portion of the side gripper assembly shown in FIG. 2C with parts broken away to show underlying parts;

FIG. 17 is a sectional view taken along line 17—17 of FIG. 16 of the rear side gripper 32b;

FIG. 19 is a perspective view of a portion of the cam track for the side grippers shown in FIGS. 16 to 18;

Figure 25:
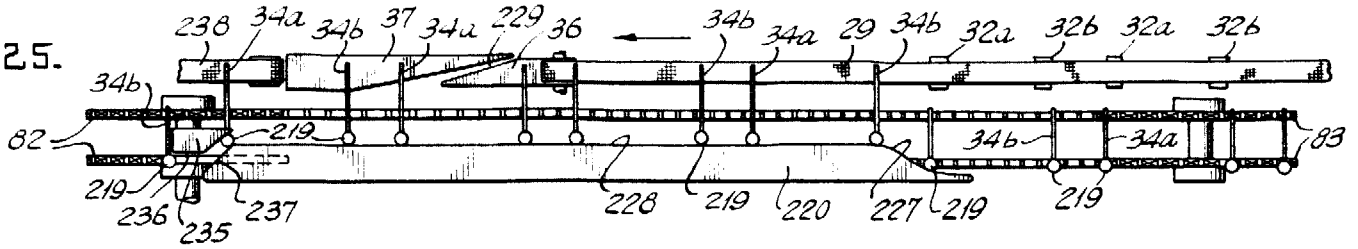

FIG. 25 is a diagrammatic plan view of the end gripper assembly 35 showing the disposition of the end gripper cam track 220 and 235 in assembly with said end grippers.

For convenience, the invention will be described in connection with the segregation and metering of fig bars. However, it will be understood that the invention applies equally well to other baked goods, such as cookies, crackers and biscuits, as well as other articles or commodities.

Figure 5:
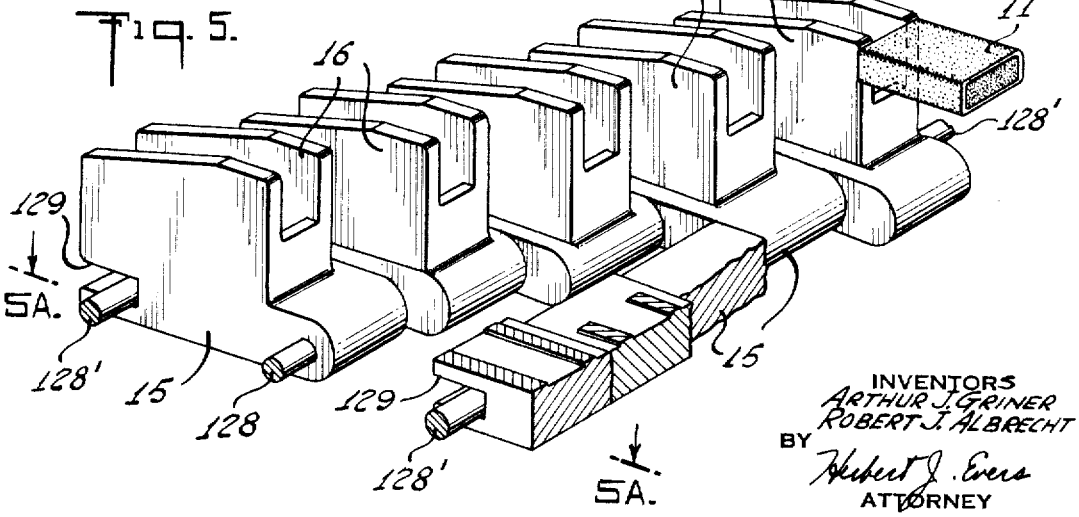
FIG. 5 is an enlarged perspective view of the flight chains 15, shown in FIG. 4.

In accordance with the invention, a series or plurality of rows of columns 10 of fig bars 11, disposed on edge is fed by a conveyor infeed assembly 12 to a downwardly inclined slide plate or charging station 13, is positively engaged by a feeder or transfer mechanism 14 comprised of a plurality of uniformly driven rows of flights 15 corresponding in number to the number of rows of fig bars fed to it, is removed and lifted up individually in rotational order from each row in staggered or stepped relation to one another by a plurality of pushers or lifter elements 16 formed as integral parts of said flights 15 (see FIG. 5) in staggered arrangement, and carried along in flat position along a curved plate 17 to a transfer zone which includes a transfer station 18. There, the groups of staggered fig bars 11 continue their advance by means of an overhead pusher assembly 19 having a plurality of uniformly driven flight chains 20 (see FIG. 2B) carrying overhead pusher elements 21 into engagement with transversely disposed, circumferentially spaced ribs or pockets 22 positioned about the periphery of a rotary turret-like collator or stacker wheel 23. The number and arrangement of the flight chains 20 and overhead pusher elements 21 correspond to their counterparts in the transfer mechanism 14. The stacker wheel 23 rotates continuously at a constant speed and includes cam driven side pushing means 24 which move linearly in and out of the pockets 22 to slide each group of fig bars transversely of the direction of rotation and combine each group of fig bars into linear alignment. The stacker wheel 23 carries the aligned fig bars to a discharge station 25 where they are generally removed in vertical, on-edge position. At approximately this point, an oscillating finger assembly 26, see FIG. 2C, comprising chain driven fingers 27 are inserted at the proper time, by means of a camming mechanism 28, behind a metered quantity of fig bars to advance the metered fig bars in pack formation to an endless belt 29. There, a side gripper assembly 30 comprising a plurality of pairs of cam actuated side grippers 32 properly spaced on an endless chain 33 move into holding engagement with the metered pack when the fingers 27 rotate out of engagement. A plurality of succeeding pairs of cam actuated end grippers 34 forming part of an end gripper assembly 35 come into gripping position at the head and rear of each metered group to retain the individual fig bars of the pack formation in assembly. This permits the side grippers 32 to be released and facilitates the wrapping of packaging material about the stacked and metered fig bars. Each such pack of fig bars, confined and supportably retained in assembly by the end grippers 34, continues to advance beyond the belt 29 onto support and former plates 36, 37, see FIG. 23. As viewed in FIG. 23, a web 38 of wrapping material is progressively folded around 3 sides of the metered group as the pack of fig bars advances along the former plates 36, 37. Thereafter, the end grippers 34 are withdrawn by suitable cam action to enable completion of the wrapping operation. Thus, the equipment will automatically produce metered quantities of fig bars in pack formation from an advancing series of columns of fig bars.

Power Drive—Side Gripper Assembly

Figure 2A:
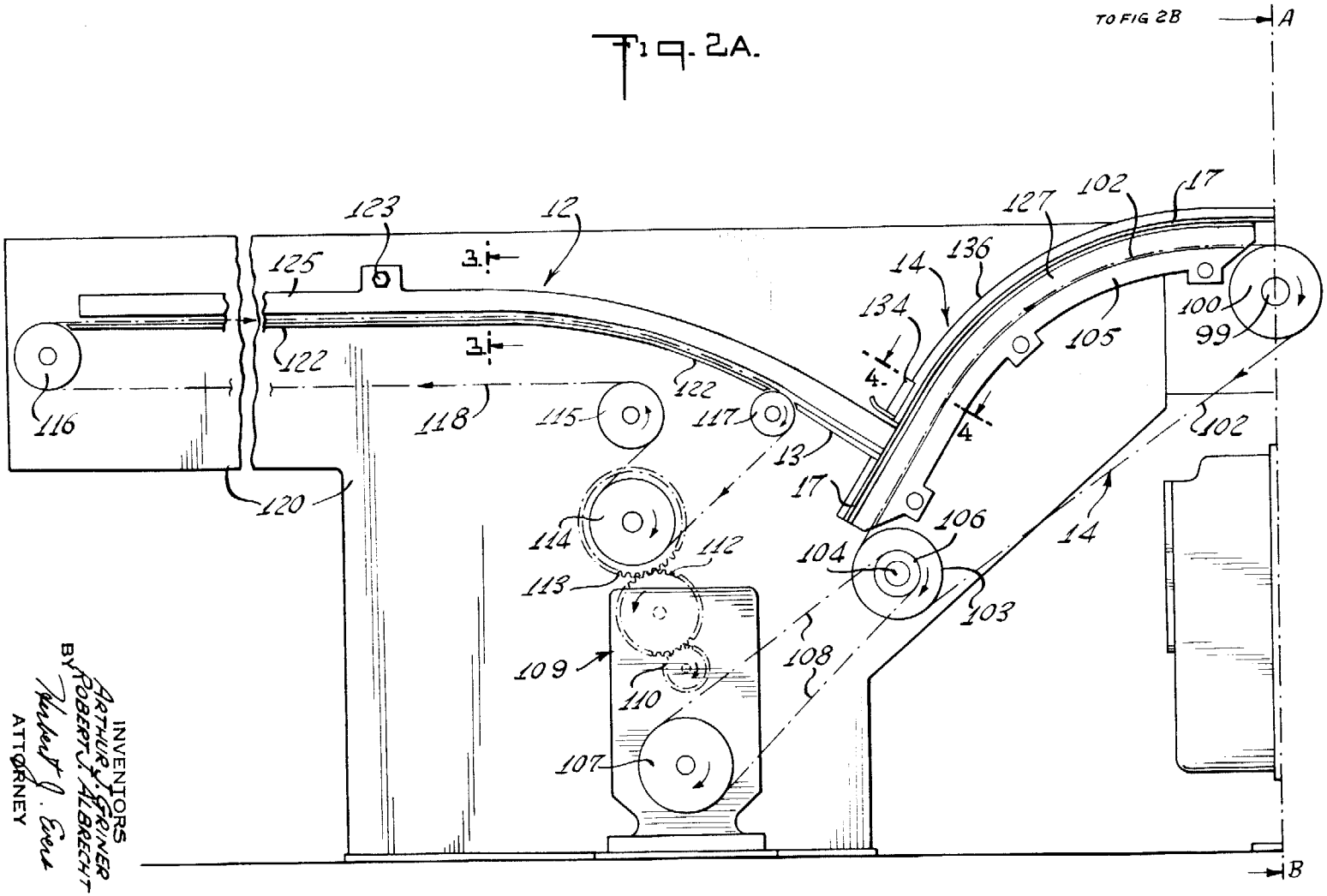
FIG. 2A is a side elevational view of the apparatus shown in FIGS. 1A and 1B, showing details of construction of the apparatus, starting from the conveyor infeed assembly 12 up to the reference line A—B, in which parts have been removed to show underlying parts.
Figure 2B:
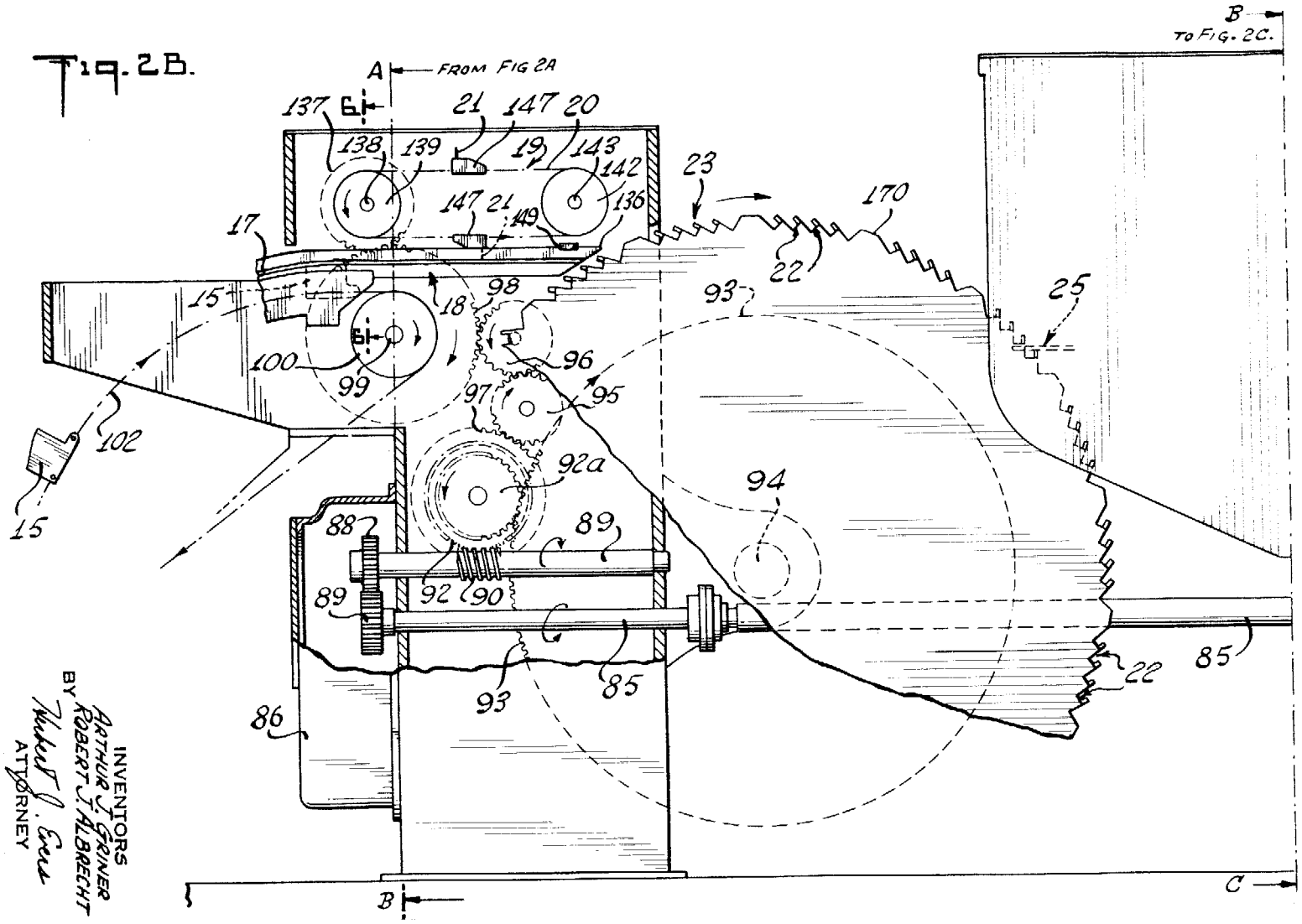
FIG. 2B is a view similar to FIG. 2A but showing a continuation of the apparatus starting with reference line A—B to reference line B—C.
Figure 2C:
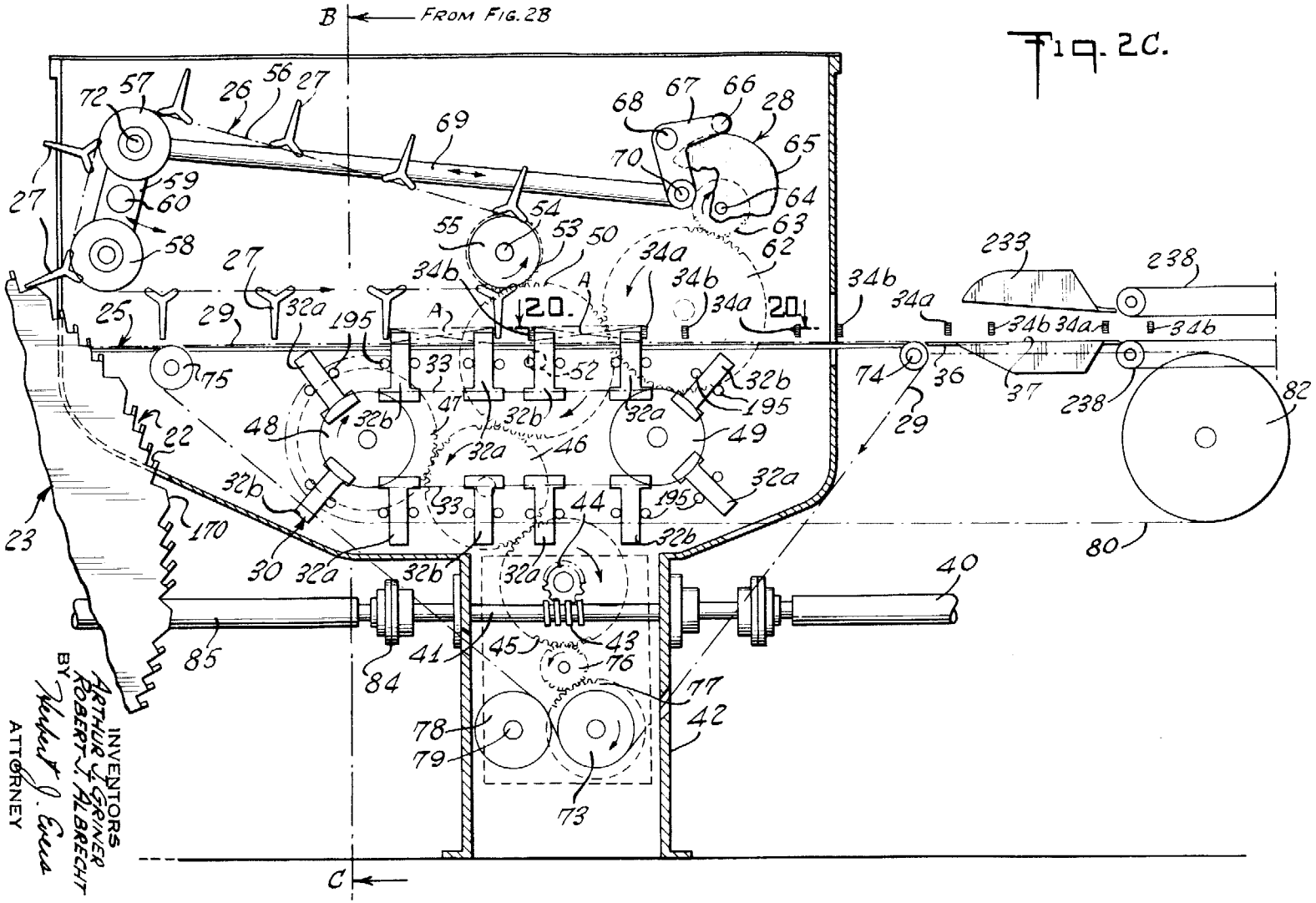
FIG. 2C is a view similar to FIG. 2B but showing a continuation of the apparatus starting with reference line B—C to the end of the apparatus including the wrapping station at the end of the end gripper assembly 35.

FIGURES 2A, 2B and 2C show how the various assemblies, such as the conveyor infeed assembly 12, the transfer mechanism 14, the stacker wheel 23, the oscillating finger assembly 26, the camming mechanism 28, the side gripper assembly 30 and the end gripper assembly 35 are all driven in unison from the same source of power. The motor (not shown) drives a main drive shaft 40, see FIG. 2C, coupled to a shaft 41 passing through a gear box 42. The shaft 41 has a worm 43 meshing with a worm wheel 44 keyed to a gear 45 that in turn meshes with an idler gear 46. The idler gear 46 drives a gear 47 carrying sprockets 48 which drive the side gripper chains 33 over the sprockets 48 and sprockets 49.

Power Drive—Oscillating Finger Assembly

An idler gear 50 on a shaft 52 meshes with the idler 46 and thereby drives an oscillating finger drive gear 53 mounted on a rotatable shaft 54. Keyed to the shaft 54 is a sprocket wheel 55 which is connected by means of a chain 56 to a pair of sprocket wheels 57 and 58 rotatably mounted on opposite ends of a bar 59 having a pivot axis 60.

Power Drive—Camming Mechanism for Oscillating Finger Assembly

The sprockets 57 and 58 can be shifted as a unit about the pivot 60 for the purpose of accelerating the movement of each of the chain-driven fingers 27 as it approaches the discharge station 25. The camming mechanism 28 for actuating the oscillation of the oscillating finger assembly 26 is driven from the idler gear 50 which meshes with a second idler gear 62 driving a pinion wheel 63 keyed to a shaft 64 on which is mounted a cam 65. When the cam 65 rotates, it moves a cam follower 66 mounted on a bell crank 67 which pivots about an axis 68 thereby moving an elongated rod 69 which is pivotably linked to the opposite end of the bell crank 67 by pin 70. This rod 69 is also linked to a shaft 72 of the sprocket 57 in such manner as to cause the pair of sprockets 57 and 58 to oscillate about their pivot axis 60 in properly timed relation to the movement of the stacker wheel 23.

Power Drive—Side Gripper Assembly and End Gripper Assembly

The endless belt 29 passing through the side gripper and end gripper stations, 30 and 35, respectively is driven around pulleys 73, 74 and 75 by means of an idler gear 76 positioned between the gear 45 and a pulley drive gear 77, the latter being secured in fixed relation to the drive pulley 73. An idler 78 mounted on an axis 79 provides the proper tension in the belt 29.

The end grippers 34 are advanced by a chain drive 80 passing over sprockets 82 and 83, the latter sprocket 83 being secured in fixed relation to the same gear, 47, for driving the side grippers 32.

Power Drive—Stacker Wheel

The drive shaft 41 has a coupling 84 keyed thereto, FIG. 2C, which is connected to a power take-off shaft 85 from which the stacker wheel 23 is driven.

Referring to FIG. 2B, the power take-off shaft 85 passes into a change gear box 86, where it transmits power through a series of gears, two gears, 87 and 88, being illustrated herein. In the embodiment shown herein, the gear 87 is shown disposed at the end of the shaft 85 and the gear 88 which is in meshing relation with the gear 87 is shown disposed on a shaft 89. However, any number of gears may be provided in the change gear box 86 in order to adjust the drive of the shaft 89 to secure any speed desired. A worm 90 provided on the shaft 89 meshes with a worm gear 92 provided with a coaxially mounted pinion 92a that drives a large ring gear 93 about a stacker wheel shaft 94. The entire stacker wheel 23, including its side pushing means 24, is driven continuously by the ring gear 93.

Power Drive—Transfer Mechanism

The gear train for imparting motion to the transfer mechanism 14 comprises a pair of idler gears 95 and 96 which transfer motion from a driver gear 97 to a gear 98 mounted on a shaft 99 disposed adjacent the upper end of the transfer mechanism 14. The driver gear 97 together with the worm gear 92 and its pinion 92a constitute a triple gear having a common rotational velocity deriving its motivation from the worm 90. Also mounted on the shaft 99 and rotating therewith is a sprocket wheel 100 about which is trained a chain 102 which extends downwardly and rearwardly around a second sprocket 103 mounted on a sprocket shaft 104, see FIG. 2A, disposed adjacent the lower end of the transfer mechanism 14, and then upwardly along a curved support 105 positioned below the curved supporting plate 17 and in spaced relation therewith. The pair of end sprockets 100 and 103 provide the means for uniformly driving the plurality of flights 15 and the lifter elements 16.

Power Drive—Overhead Pusher Assembly

Meshing with the gear 98 is a driver gear 137 mounted on a shaft 138 which is secured to bearings in the frame (not shown). Fixed to the shaft 138 are a plurality of uniformly spaced sprockets 139 each of which, by means of a chain 20, drives a similarly disposed sprocket 142 mounted on a shaft 143 positioned in spaced parallel relation to the shaft 138.

Power Drive—Conveyor Infeed Assembly

Coaxially mounted on the shaft 104, FIG. 2A, is a sprocket 106 driving a second sprocket 107 by means of a chain drive 108. This sprocket 107 is part of a variable speed control mechanism 109 which constitutes the means for driving the feed belt mechanism. The output shaft of the variable speed drive 109 drives a gear 110 which through intermediate idler gear 112 drives a gear 113 which is constructed to drive a coaxially mounted infeed drive pulley 114. The drive for the feed apparatus 12 is shown more particularly in FIGS. 1A and 2A. This includes pulleys 115, 116 and 117 connected together by a feed belt or chain 118.

Feed Apparatus for Charging Station

Figure 1A:
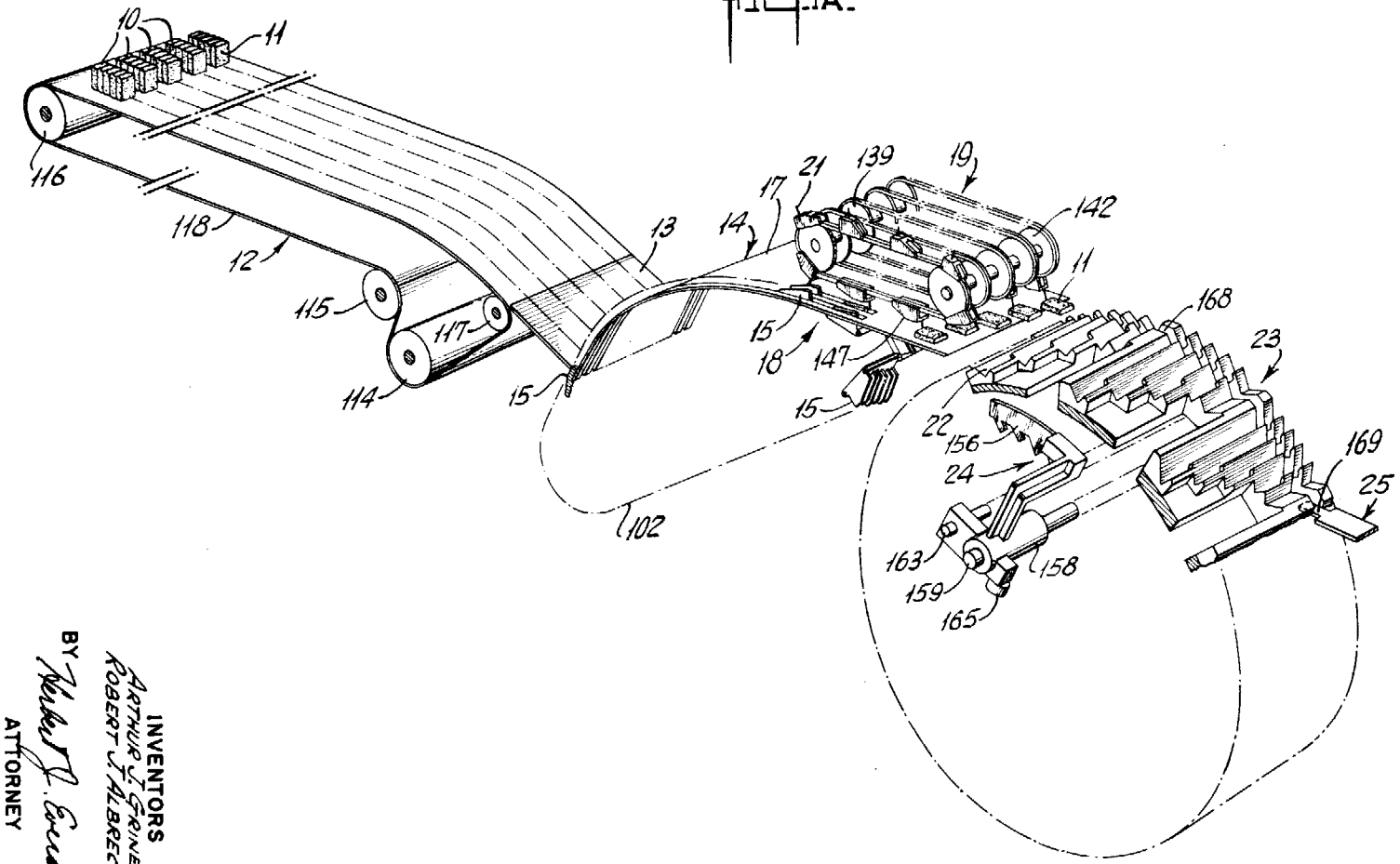
FIG. 1A is an illustration of an apparatus embodying the principles of the invention, showing a portion of the apparatus starting with the conveyor infeed assembly 12 up to the stacker wheel 23.
Figure 18:
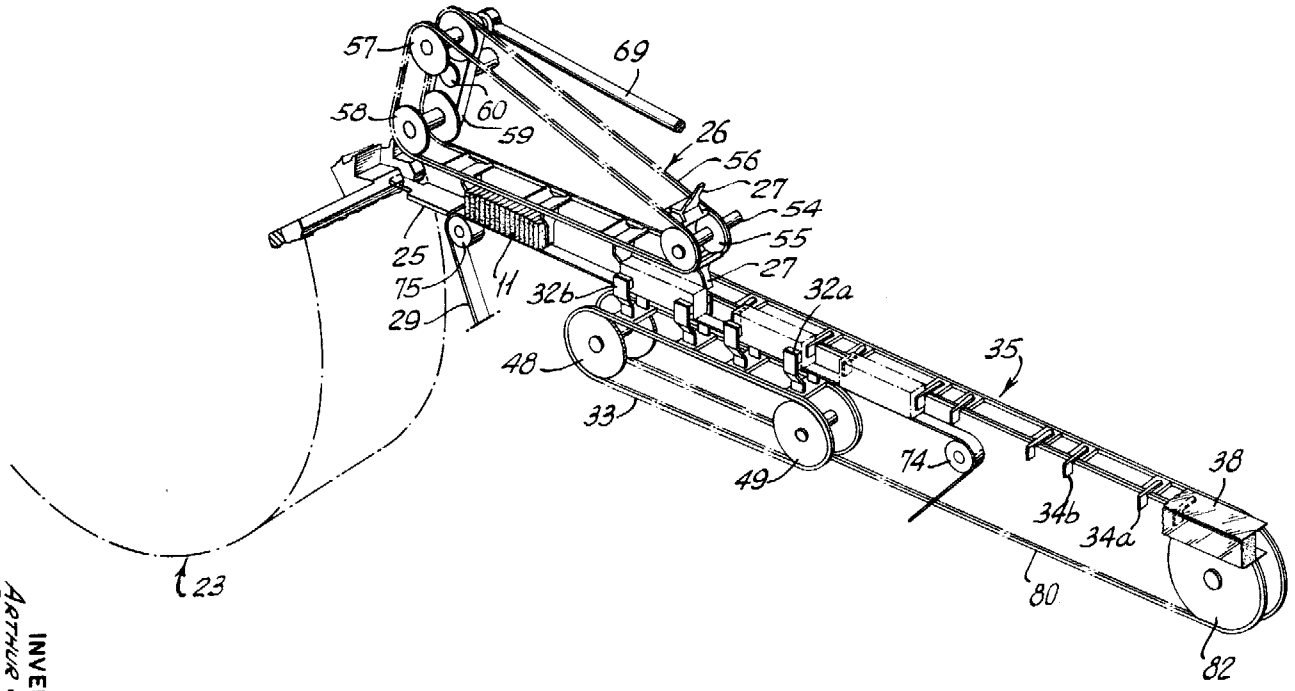
FIG. 18 is a sectional view taken along line 18—18 of FIG. 16 showing details of the front side gripper **32*a***.
Figure 3:
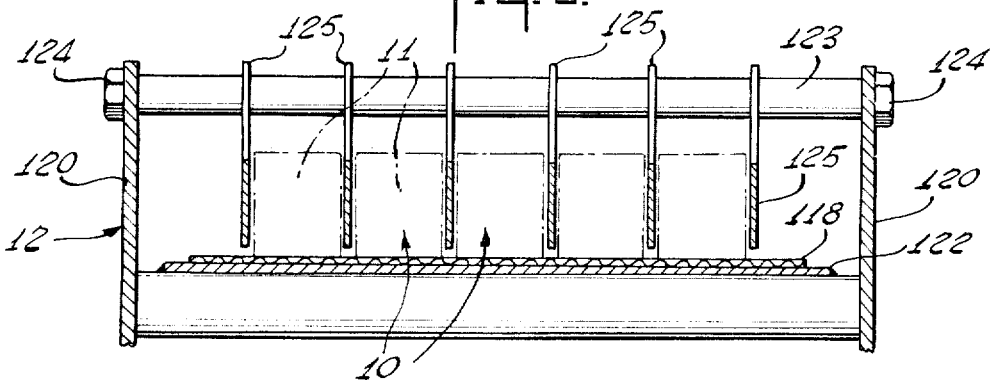
FIG. 3 is an enlarged sectional view taken along line 3—3 of FIG. 2A, showing details of the conveyor infeed assembly 12.

The feed apparatus for the charging station 13, generally indicated at 12 in FIG. 1A, is shown more particularly in FIGS. 2A and 3. The structure defining the feed apparatus for this station includes a pair of frame members 120 in which are journaled for rotation the pulleys 114, 115, 116 and 117. A guide plate 122 carried by the frames 120 cooperates to support the upper run of the feed belt 118. Thus, when the gear 113, see FIGS. 1A and 2A, is rotating clockwise, the feed belt 118 moves forwardly over the supporting guide plate 112, over the pulley 117, then downwardly under the drive pulley 114, upwardly over the idler pulley 115, and then rearwardly around the end pulley 116.

In the conveying of freshly baked goods such as fig bars, care should be exercised because the fig bars tend to stick to the conveyor. For these and other reasons, it is preferred that the feed belt 118 be a wire-mesh feed chain coated with polyethylene, although other suitable conveying belts or chains capable of minimizing the aforementioned difficulty may be used.

Means are provided to prevent lateral displacement of the fig bars during their travel on the belt 118. Accordingly, one or more cross bars or supporting rods 123, see FIG. 3, is mounted on the upper portions of the frame members 120, sufficiently above the belt 118 so as not to interfere with the progress of the fig bars, and fixedly held by threaded nuts 124 which fit on complementary threaded ends of the cross bar. A plurality of guide walls or partitions 125 depending from the cross bar 123 serve to guide the fig bar columns 10 to the transfer mechanism 14.

As the columns 10 progress forwardly it is desirable to change the inclination of the fig bars 11 in order to change the relationship of the fig bars from a side-by-side relationship to a gravity feed relationship. As indicated in FIGS. 1A and 2A, the discharge end of the conveyor belt 118 is progressively inclined forwardly until it assumes the inclination of the slide plate 13. This enables the transition of the fig bars from the conveyor 12 to the charging station to occur smoothly. To offset the tendency for the fig bars to stick, the slide plate 13 is preferably in the form of a unitary hard-surfaced apron made of Teflon or other suitable material. The transmission of fig bars on the slide plate 13 establishes a supply of fig bars for the transfer mechanism 14, which is constantly urged forward by the pressure of the fig bars behind. Preferably the inclination of the slide plate 13 is approximately 20 to 35° with respect to the horizontal, although flatter or steeper inclinations may be used. In certain instances it may be desirable to steeply incline the plate 13 to aid in establishing a more positive feed. In any case, there is always a sufficient supply of fig bars on the slide plate 13 to prevent the fig bars from tumbling in the direction of incline.

Transfer Mechanism

The fig bars are drawn off from the columns 10 on the slide plate 13 to the transfer mechanism 14 as will be apparent from the previous description and the individual fig bars move one by one to the stacker wheel 23. It has been found desirable to suitably space the fig bars prior to their coming under the control of the combining mechanism of the stacker wheel 23. This is accomplished in the present invention in such manner that the fig bars traveling in a plurality of columns are transferred into a plurality of rows in staggered relation to one another, the rows of staggered fig bars corresponding to the number of columns 10.

Referring specifically to FIGS. 1A, 2A, 4 and 5, it will be noted that the transfer mechanism 14, comprises a pair of spaced endless drive belts 102 adapted to run in guideways 126 in the frame 127 of the transfer mechanism. The chains 102 straddle and transport a plurality of rows of flights 15 which are arranged to correspond in number with the columns 10 and to travel in orbits which are generally aligned respectively with the fig bar columns 10. Referring to FIGS. 1A and 2A, the orbital path of travel extends upwardly and forwardly and returns along a lower run shown in dotted outline. Each flight 15 is preferably in the form of a carriage or block member which is hingedly connected to its adjacent flight by means of elongated pins 128, 128', so as to form in assembly a succession of stepped, interhinged lifter elements. Provision is made for any changes that may occur in the pitch distance between hinge pins 128 and 128' as they travel in the orbital path of the conveying chain 102 by means of a slot or groove 129 in each of the flights 15. The ends of the pins 128, 128' are secured to yokes 130 that are connected to the inside surfaces of the chains 102 by short, reduced diameter bars or chain links 131 which pass through slotted plates 132 preferably made of nylon to reduce friction. Integral with each flight 15 is a pair of the bifurcated flights or lifter elements 16 which extends upwardly through spaced slotted openings 133 in the curved plate 17. Corresponding slots 133a are provided in the slide plate 13 for the passage therethrough of the lifter elements 16.

Figure 4:
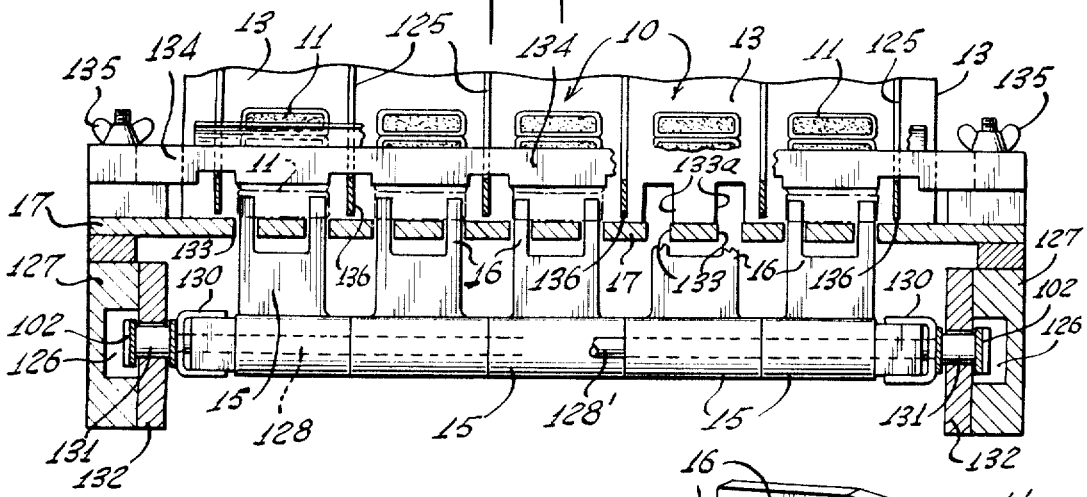
FIG. 4 is an enlarged sectional view taken along line 4—4 of FIG. 2A, showing details of the transfer mechanism 14.

As best seen in FIGS. 2A and 4, the leading fig bars in each stacked column 10 on the slide plate 13 is disposed flatly against the steeply inclined surface of the curved plate 17. Consequently, as the lifter element 16 traveling in the corresponding row of the conveying chain 102 approaches the charging station 13, the bifurcated flights 16 extend sufficiently through the slots 133 in the curved plate 17 to engage the leading fig bar and push it up. A stop or gate 134 secured by clamping nuts 135 to the frame members 127 (see FIG. 4) allows the stripping off or removal of one fig bar at a time from each column. By this operation the leading fig bar is drawn off from each column 10 where it is disposed in an on-edge position, and pushed up the curved plate 17 where it is carried in flat position, by the bifurcated flights 15, and the stacked column 10 advances along the charging station to close the gap created by the removed fig bar. As will be apparent, succeeding flights 15 in this column will remove the fig bars from the stacked column 10 one by one to the transfer zone 18 of the curved plate 17. Spaced guide rails 136 serve to guide the removed fig bars toward the transfer zone 18.

It will be noted in FIGS. 1A and 4 that the disposition of the lifter element 16 in each set is such that the drawing off of individual fig bars from each row occurs in rotational order and this order of withdrawal is repeated by each set of lifter elements. In this manner the fig bars are fed in regular spaced procession and in staggered relation to one another along the curved plate 17 toward the transfer station 18.

Figure 6:
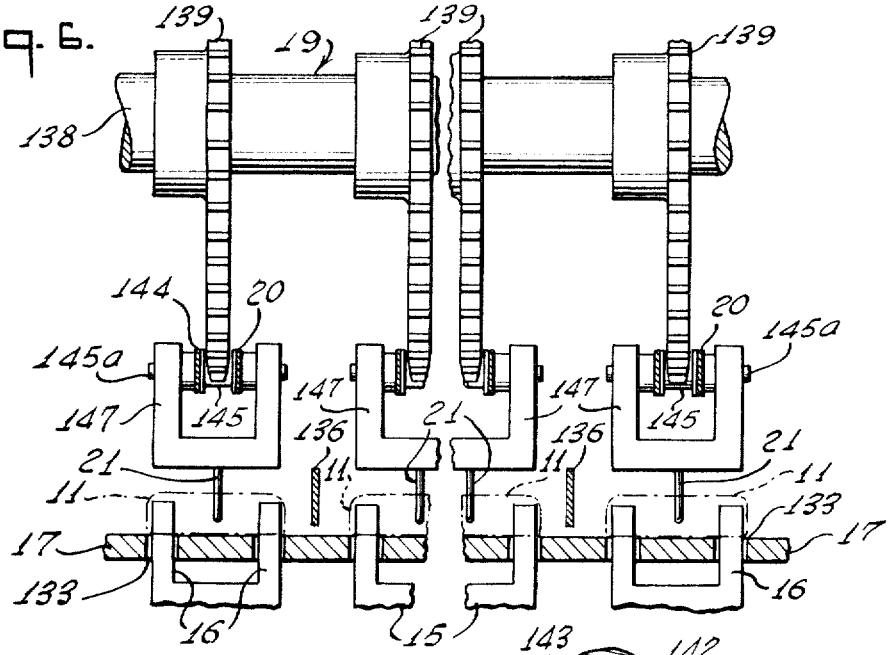
FIG. 6 is an enlarged fragmentary sectional view taken along line 6—6 of FIG. 2B, showing details of the overhead pusher assembly 19.
Figure 7:
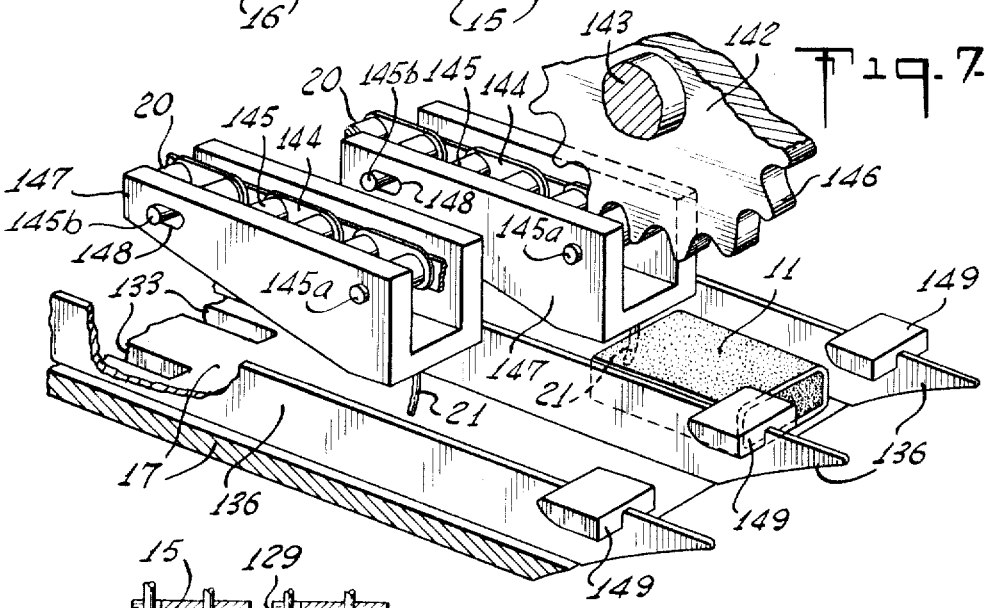
FIG. 7 is an enlarged perspective view of the overhead pusher elements 21 shown in FIG. 6.
Figure 5A:
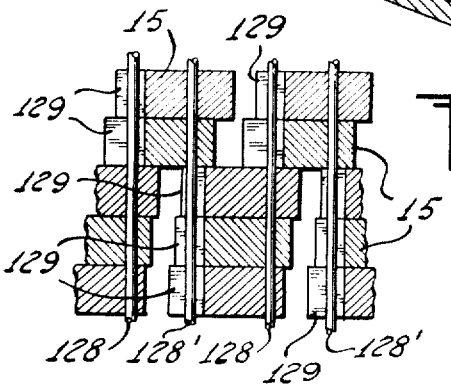
FIG. 5A is a sectional view taken on the line 5A—5A of FIG. 5.

Means are provided for picking up the spaced fig bars on the transfer station 18 and transferring them to the pockets 22 of the stacker wheel 23. This may be accomplished in the present invention by the overhead pusher assembly 19 comprising the flight chains 20 that are uniformly driven by the gear 137. Referring to FIGS. 6 and 7, each of the flight chains 20 comprises a series of side links 144 and interconnected crosslinks 145 which are adapted to fit between the teeth or spokes 146 of its associated sprockets 139, 142. Each chain 20 carries a plurality of spaced U-shaped carriages 147 which straddle the side links 144 of the chain and are attached thereto by pairs of link pins 145a and 145b. Any change in the pitch distance of the link pins 145a, 145b as they travel around the sprocket 139, 142 is provided for by a slot 148 in the carriage 147. Mounted on the carriage 147 is the pusher element 21. As viewed in FIG. 2B, the upper flights of the chains 20 travel rearwardly along a horizontal path and return along a lower run in a forward direction. The several rows of overhead pusher elements 21 are staggered with respect to one another and are disposed approximately in the respective planes of the rows of lifter elements 15.

As each staggered group of fig bars approaches the transfer station 18, it is smoothly engaged by the upper pusher elements 21, which are so spaced that they arrive behind each of the staggered fig bars and travel between the bifurcations of the lifting elements 16, as clearly shown in FIG. 6. Thereafter, the lifter elements 16 start to recede in the slots 133. By the time the fig bars reach the transfer station 18 the slotted openings 133 have been passed, the bifurcated lifting elements 16 have been fully receded, and the overhead pushers 21 are able to freely move the fig bars along the transfer station 18 between the guide rails 136.

There is a tendency for the fig bars to be carried upwardly by the upper pusher element 21 at the end of its lower run. To obviate this situation, the upper portions of guide rails 136 in the vicinity of transfer station 18 may be provided respectively with transversely spaced keeper plates or wings 149, the height and the extent of lateral overhang of each wing 149 being such as to allow fig bars 11 to pass thereunder and to permit the pusher elements 21 to rise therebetween, see FIG. 7.

Stacker wheel

The staggered rows of fig bars from the transfer plate 18 are fed into the continuously rotating stacker wheel 23. Said stacker wheel 23 comprises a hollow cylindrical drum 150, a circular side wall 151 enclosing one end of the wheel, and a central bearing 152 fixed to the side wall for rotating said wheel about the wheel axle 94. The stacker wheel also includes the spaced pockets 22 arranged about the peripheral surface of the drum 150. Each pocket 22 comprises a receiving support table or wall 153 having a width approximately the long dimension of the fig bar, a relatively narrower shelf or wall 154 disposed parallel thereto, and a connecting wall 155 of a width slightly larger than the thickness of the fig bar and integrally united with the walls 153 and 154. In assembly, the shelf 154 constitutes a lip forming an integral part of the wall 153 of the preceding adjoining pocket 22. A viewed in FIG. 2B, the walls 153 and 154 are disposed approximately horizontally in the vicinity of the transfer station 18 and are approximately vertical in the area of the discharge station 25.

The individual fig bars of each group are delivered in rotation to the successive pockets 22 in the stacker wheel 23 in the same staggered order in which they are supplied. Consequently, each pocket is made substantially similar, except that the length of the individual pockets in each group will vary. That is to say, the pockets in each group will start at one edge of the wheel 23 and extend laterally in stepped relation to one another toward the other edge of the wheel 23. In this manner each group of staggered fig bars being fed into the pockets of the stacker wheel will be deposited into a group of pockets which have been suitably stepped to receive them. Interference of the shelf 154 with the deposition of a fig bar in the associated pocket 22 may be avoided in the present instance by foreshortening such shelf at its stepped extremity, thereby in effect forming the receiving end of the pocket into an angular or V-shaped slot 161, the remainder of the pocket being generally U-shaped. It will be appreciated however, that the pockets 22 may be angular or V-shaped over the entire length thereof, if so desired.

Figure 9:
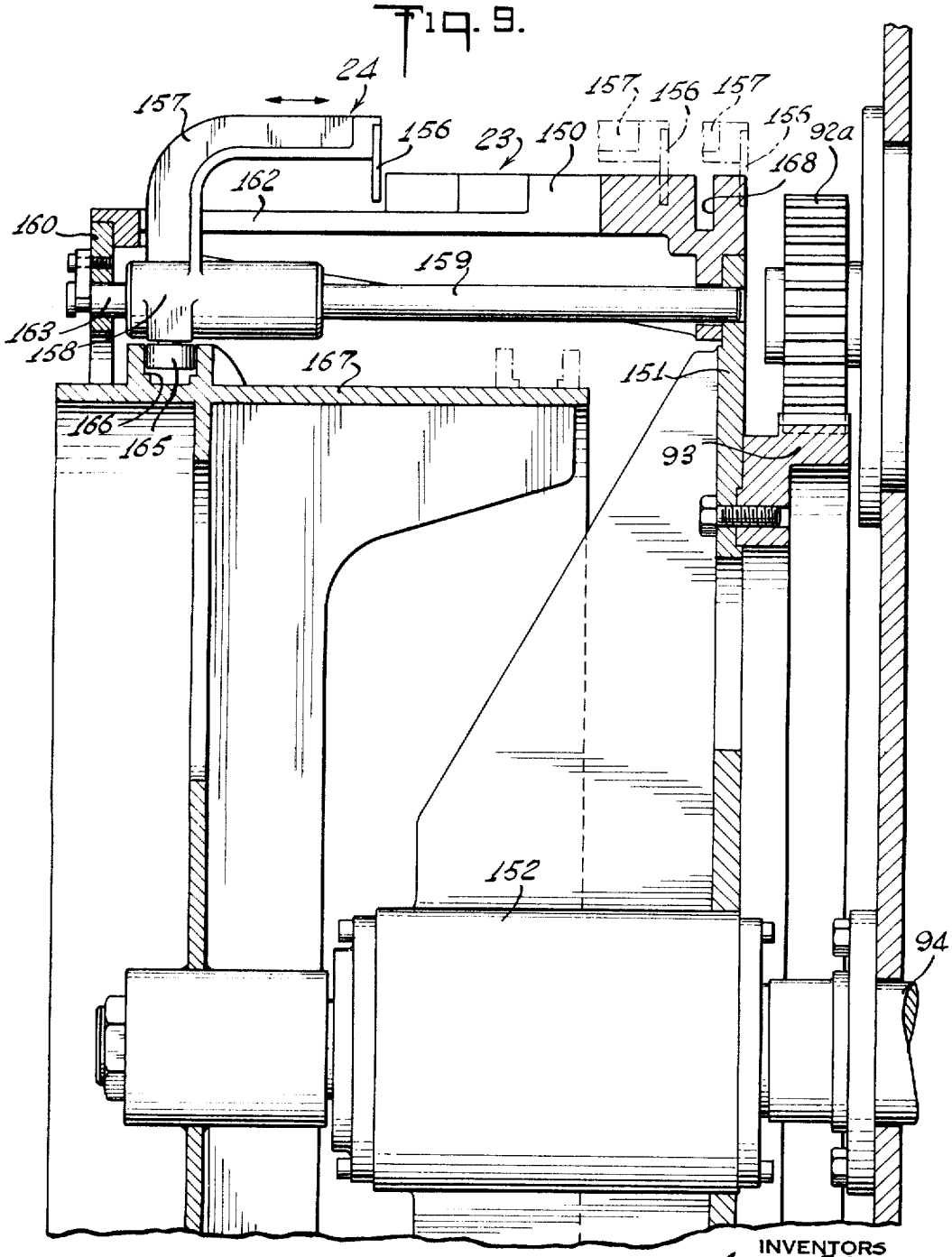
FIG. 9 is a sectional view taken along line 9—9 of FIG. 8.

In the present invention provision is made for depositing in rotational order a series of groups of staggered rows of fig bars on the stacker wheel 23 at one station along the travel thereof, combining the fig bars into a single row, and removing the fig bars in metered quantities at a single place at a second station along the travel of the stacker wheel 23, in proper alignment and proper condition for packaging. To this end, the cam actuated side pushing means 24 comprises a plurality of circumferentially spaced pusher plates 156 rotating about the stationary axle 94 of the stacker wheel 23. The pusher plates 156 are each carried by a side pusher arm or angled support 157, see FIG. 9, having a bearing 158 that is slidably carried on a transverse guide rod 159 mounted between the side wall 151 of the stacker wheel and an annular wall 160. This annular wall 160 is secured to the inner edge of the drum 150. Slots 162 define clearance spaces through which the angled support can radially extend. A second rod 163, parallel to rod 169, passing through the angled support 157 and having its ends retained in the side wall 151 and the annular wall 160, prevents relative rotation between the stacker wheel 23 and the pusher plate 156.

The pusher plate 156 is in the form of the toothed plate having a plurality of fingers or extensions 164 which correspond in number and conform to the cross-sectional shape of a group of the staggered pockets 22. During a cycle of rotation of the stacker wheel 23, the set of fingers 164 are actuated into a combining action by a cam which will now be explained.

There are a number of pusher plates 156 mounted on angled supports 157 carried by the stacker wheel 23, one for each group of stepped pockets 22 therein. Each of these angled supports 157 carries a cam roller or follower 165 projecting from the sleeved bearing 158. All of these cam rollers 165 operate in a single cam track or groove 166 in a stationary cam drum 167 which is mounted on the axle 94 of the stacker wheel 23 and disposed within the hollow of the stacker wheel 23.

In assembly, the drum 150, the guide rods 159 and 163, the pusher plates 156 and the cam drum 167 are concentrically disposed, with the pocketed surface of the drum 150 between the pusher plates 156 and the guide rods, and the cam drum 167 extending inside the relatively larger drum 150.

Figures 10, 11:
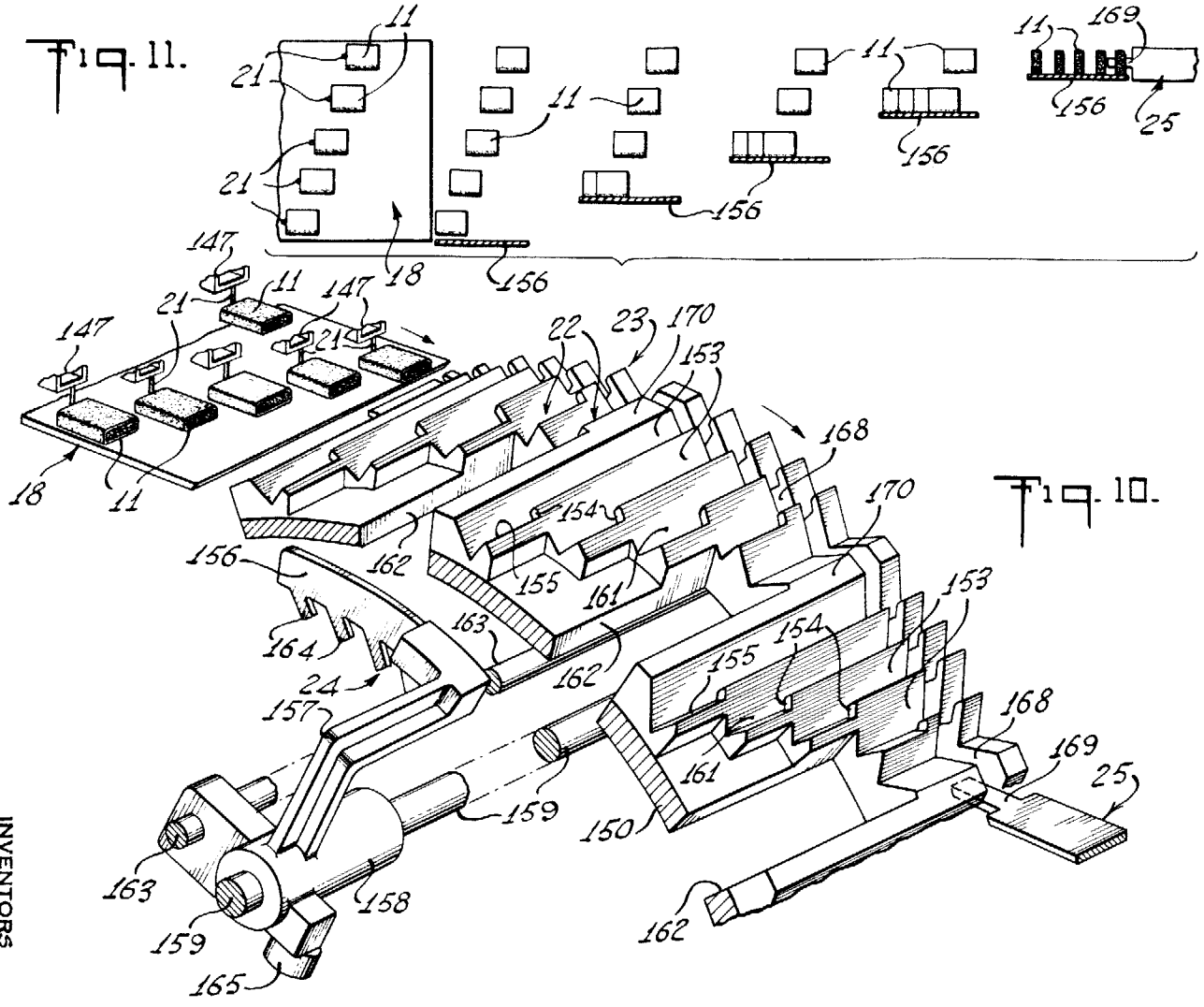
FIG. 10 is a fragmentary exploded view of the stacker wheel in perspective with parts broken away to show underlying parts.
FIG. 11 is a diagrammatic plan view of the operation of the pusher plate 156 of the stacker wheel 23 showing the progressive transverse movement of the pusher plate as the stacker wheel rotates.

As the stacker wheel 23 rotates it carries the pusher plate 156 and the angled support 157 as a unit through a circular path and causes the cam roller 165 to traverse the cam groove 166. This travel of the angled support 157 and the shape of the cam groove 166 slides the sleeve 158 along the guide rod 159, effecting a transverse movement of the pusher plate 156 and also a transverse movement of the set of fingers 164 in the group of pockets 22 associated therewith. Referring to FIG. 11, there is shown a diagrammatic plan of various stages in the combining action of the side pusher arm 157 and its associated pusher plate 156. During the transverse travel of the plate 156 the individual fingers 164 travel as a unit through a group of the pockets 22, progressively contacting the grouping of staggered rows of fig bars and pushing the contacted fig bars toward the opposite ends of the pockets. It is this transverse movement of the fingers 164 in the pockets 22 that progressively shifts the fig bars toward the opposite ends of the pockets 22 to combine or form them in linear alignment. It is to be understood however, that the combining of the fig bars into linear alignment may be accomplished at either end of the pockets 22, or at any intermediate position, if so desired.

When the fig bars reach the point in their travel in the vicinity of the discharge station 25 they are fully aligned adjacent to the edge of the stacker wheel 23 and positioned above a circumferential slot 168 which cooperates with the discharge station 25 to receive the aligned fig bars. For this purpose, the discharge station 25 is provided with a narrow extension 169 which extends into the interior of the circumferential slot 168 to remove the fig bars from the stacker wheel 23. As the fig bars are stripped from the stacker wheel 23, the transverse movement of the pusher plate 156 is properly timed with the rotation thereof so that it is substantially at a standstill relative to the transverse direcion of travel. This position of the pusher plate 156 is clearly indicated in the dotted outline position to the left of the slot 168 as viewed in FIG. 9. Upon passing the extension 169 of the discharge station 25, the pusher plate 156 resumes its transverse travel to the edge of the stacker wheel 23, as indicated in the dotted outline position to the right of the slot 168 as viewed in FIG. 9, in order to scrape and clear the pockets 22 of any residual portions or parts of fig bars that may have been retained therein. During the remaining portion of the cycle of revolution, the action of the cam follower 165 in the cam groove 166 imparts a retrograde movement to the pusher plate 156, causing it to retrogress along its path of slide and revert to its original position.

It will be observed that for purposes of metering, a small clearance space 170 is provided in the stacker wheel 23 between each of the combined groups of fig bars.

Oscillating Finger Assembly

To form a unit of the desired number of fig bars to be packaged, one or more of the spaced groups of fig bars in the stacker wheel 23 is automatically metered. The means of metering is related to the number of rows of fig bars that is delivered to the stacker wheel 23. The general scheme of metering employed in the present invention takes place in three steps. First, the moving columns of fig bars on the slide plate 13 are segregated, one at a time, into a desired staggered grouping containing as many fig bars as there are columns of fig bars. If there are five columns, these columns will be segregated into groups of five staggered fig bars in the manner illustrated and described herein. This operation distributes the fig bars without regard to the thickness of the individual fig bar. Thereafter, the staggered groups are combined into a single column. Suitable clearance space is provided between each combined group so that any number of groups can be later consolidated to form the desired unit. Lastly, the movement of the single column of spaced groups of fig bars is timed in coordination with the movement of the indexing finger 27 of the oscillating finger assembly 26 to meter the groups into a packageable unit having the desired number of fig bars. Thus, three groups of fig bars may be combined to form a "slug pack" or unit consisting of fifteen fig bars. Obviously, a larger or smaller number of groups of fig bars may be consolidated by making suitable changes, such as in the shape of the cam 65 or the speed of the chain 56. It will also be apparent that while three groups of fig bars may be consolidated to make up a packageable unit of fifteen fig bars, the unit may also be composed from five groups containing three fig bars each. In the above manner, by suitable variation, a packageable unit containing any desired number of fig bars may be automatically formed.

The oscillating finger assembly or collecting mechanism 26 comprises the pair of chains 56 spaced slightly apart and carrying therebetween the fingers 27 as shown in FIGS. 1B and 2C. The fingers 27, shown in detail in FIG. 15 are each formed integral with a pair of convergent arms 172 and 173, and are uniformly disposed along the chain 56 by means of chain cross links 174 and 175, passing respectively through a sleeve 176 in the arm 173 and a slot 177 in the arm 172. The slot 177 compensates for any changes in pitch between the links of the chain 56. The fingers 27 are adapted to move into the slot 168 of the stacker wheel 23 at the properly timed moment in the vicinity of the space 170 and push the groups of combined fig bars from the stacker wheel on to the horizontal discharge station 25 and then on to the conveyor belt 29 where the jaws of the grippers 32 take over.

By referring to FIG. 12 it will be noted that for the finger 27 to arrive in the space 170 in the stacker wheel 23, its approach will have to interfere with the approach path of travel of the fig bars on the stacker wheel 23. To obviate this possibility, provision is made in the present invention for pivoting the fingers 27 about the pivot axis 60 so that they can be inserted into the space 170 and extend into the slot 168 at the proper time without damaging the approaching fig bars. In the present illustration, the fingers 27 are inserted behind every third group of fig bars to make up a unit of fifteen fig bars stacked on edge. By synchronizing the action of the cam mechanism 28 with the rotation of the stacker wheel 23, a clockwise pivotal movement is imposed on the normal movement of the finger 27 in the vicinity of the sprocket 58 as such finger is being inserted in the slot 168. This imparts an accelerated movement to the finger 27 and enables it to be rapidly inserted in the space 170 behind the fifteenth fig bar. By a reverse camming action the sprockets 57, 58 are reversely oscillated to return them to a proper position to enable the next finger 27 to be inserted behind the next unit of fifteen fig bars. FIG. 12 depicts the position of the finger 27 during the period of clockwise oscillation about the pivot axis 60 which occurs during the period of insertion of the finger 27 in space 170. FIG. 13 is similar to FIG. 12 but shows the position of the finger 27 as the sprocket 58 is being returned by counterclockwise rotation about the pivot axis 60. FIG. 14 shows the furthest extent of travel of the sprocket 58 in a counterclockwise direction. At this point the next finger 27 will start its approach to enter the space 170 as the sprocket 58 commences its clockwise oscillatory motion.

Side Gripper Assembly

The construction and operation of the side gripper assembly 30 are illustrated in FIGS. 16 to 19. The side gripper assembly 30 comprises a pair of forward side grippers 32a and a pair of rear side grippers 32b which are straddled and are transported by the pair of endless side gripper chains 33 disposed below the upper run of the conveyor belt 29. Each of the chains 33 comprise interconnected links 179 which run in a groove 180 in the frame 182, and cross link chain pins 183 which pass through a slotted plate 184 and are connected to the side grippers. The path of the grooves 180 is generally parallel to the path of the chain 33 as it travels around the end sprockets 48 and 49.

Referring to FIGS. 16 and 17, the rear gripper 32b comprises a longitudinal carriage body 185 having two pairs of laterally extending ears 186, one at each end. Each pair of the ears 186 is connected to the side gripper by chain 33, through the pins 183 which fit in openings 187 and 188 in the ears. It will be noted that the opening 188 is in the form of a slot for the purpose of compensating for any change that might occur in the pitch distance between the links of the chain 33. Disposed on one side of the gripper 32 is a rock shaft 189 extending lengthwise of the carriage body 185 and through apertures 190 in the ears 186. Similarly, a like shaft 189 extends through the ears 186 on the opposite side of the carriage body. Each shaft 189 pivotally carries a block 192 to which is rigidly secured a holder arm 193 carrying at its end a gripper pad 194. The block 192, the holder arm 103, and the gripper body 194 are free to oscillate as a unit in the carriage body 185 about the axis of the rock shaft 189. A pair of coil springs 195 connected between the holder arms 193 urges the gripper pads 194 into the closed position shown in solid outline in FIG. 17. The holder arm 193 of the forward and rear side grippers 32a and 32b have brackets 196a and 196b for supporting cam followers or rollers 197a and 197b, respectively, which run along a cam track having an upper camming surface 198 and a lower camming surface 199. The roller 197a is at a higher level than the roller 197b, and so rides along the upper surface 198 of the cam track, while the roller 197b rides along the cam surface 199. The cam track is secured to the bottom of a plate 200, along the top surface of which the upper run of the conveyor belt 29 slides.

A stop plate 202 secured to the upper surface of the carriage body 185 is provided with slotted openings 203 to limit the inward and outward movements of the gripper pads 194. As shown in FIG. 19 the upper camming surface 198 has three operative sections 204a, 205a and 206a, and the lower camming surface 199 has operative sections 204b, 205b and 206b. When the front side gripper roller 197a is riding on the upper cam of section 204a, the front side gripper 32a is held in an open position so that it may be advanced to clamp the front end of the metered group A shown in FIG. 12, which travels at a slightly lower linear speed than said gripper. As the front gripper 32a approaches the front end of the metered group A, the roller 197a rides off the section 204a and comes into adjacency with section 205a, causing the springs 195 to urge the holder arms 193 together and bring the gripper pads 194 into gripping action with the sides of the metered unit as shown in FIGS. 2C and 16. At the same time, the roller 197b of the rear gripper 32b rides on the lower cam section 205b to similarly cause the gripper pads 194 thereof to close. The grippers, 32a and 32b, are spaced from each other a distance approximately the length of a metered unit. Consequently, the gripping action performed by the gripper 32a upon the sides of the advancing end of the metered unit A is effected simultaneously with the gripper 32b upon the opposite end of the metered unit. When the grippers close, the metered group A commences to travel at a higher speed, thereby creating a space between the metered group A and the next following group. This space may be subsequently utilized to provide room for sealing and cutting the ends of the packaging material to be wrapped around such metered unit. As soon as the grippers close upon the sides of the metered unit A, see FIG. 2C, the finger 27 at the head of the metered unit starts to travel around the end sprocket 53 of the oscillating finger assembly, thereby increasing the peripheral speed of the finger 27 and causing it to rise without interfering with the advance of the metered unit. The side grippers 32a and 32b advance the metered unit at a uniform rate of speed. Thus, under the influence of the side grippers, the belt 29 slips relatively to the fig bars. The speed of the next set of side grippers is coordinated to come into gripping action at the front and rear portions of the next succeeding metered unit at approximately the time when the next finger 27 reaches the sprocket 53.

When the roller 197a of the front gripper 32a rides on the upper cam section 206a, the holder arms 193 are forced outwardly to release the gripper pads 194. This occurs as the front gripper 32a approaches the vicinity of the end sprocket 49, see FIG. 2C. However, prior to the instant the front gripper 32a is released, a front flight finger 34a, constituting an element of the front end gripper assembly 35a, traveling at the same speed as the front side gripper 32a is inserted in front of the leading fig bar to prevent it from falling forward. Following the release of the front side gripper, the rear side gripper 32b is similarly released when it approaches the section 206b of the cam track in the vicinity of the sprocket 49, at which time the rear end gripper finger 34b is cammed into position to retain the metered unit in assembly. Thereafter, the side grippers 32 travel around the sprockets 49, 48 to repeat their cycle of operation.

End Gripper Assembly

The front and rear end grippers, 34a and 34b, of the end gripper assembly 35 rotate with the dual chain 80 around the sprockets 82, 83 (see FIGS. 1B and 2C). The end gripper assembly shown in detail in FIGS. 20 to 25 comprises a carriage 208 suitably transported by the pair of endless chains 80 at the same speed and in the direction in which the metered units are moving. Each of the chains 80 comprise interconnected cross links 209, see FIG. 22, which ride in a slotted plate 210 secured to a frame 211 having a groove 212 for the reception of the end links 221 of the chain 80. The chains 80 are disposed on opposite sides of the carriage body 208 and are suitably secured thereto by the pins 209 of the chain. The carriage 208 is provided with a pair of parallel arms, 213 and 214, which are pivotally attached at one end to upstanding studs, 215 and 216, respectively, FIG. 20, and are loosely pivotally secured at the other end to the end grippers 34 by pivot bolts 217, 218. Bolts 217 and 218 are spaced a distance apart approximately equal to the space between the studs, 215, 216, to thereby form a parallel linkage system. Attached to the arm 213 is a fixed pin on which loosely rotates a cam roller or follower 219. This cam follower 219 is adapted to follow the surface of a cam 220 which is fixedly secured to the frame of the machine.

Figures 20, 21, 22:
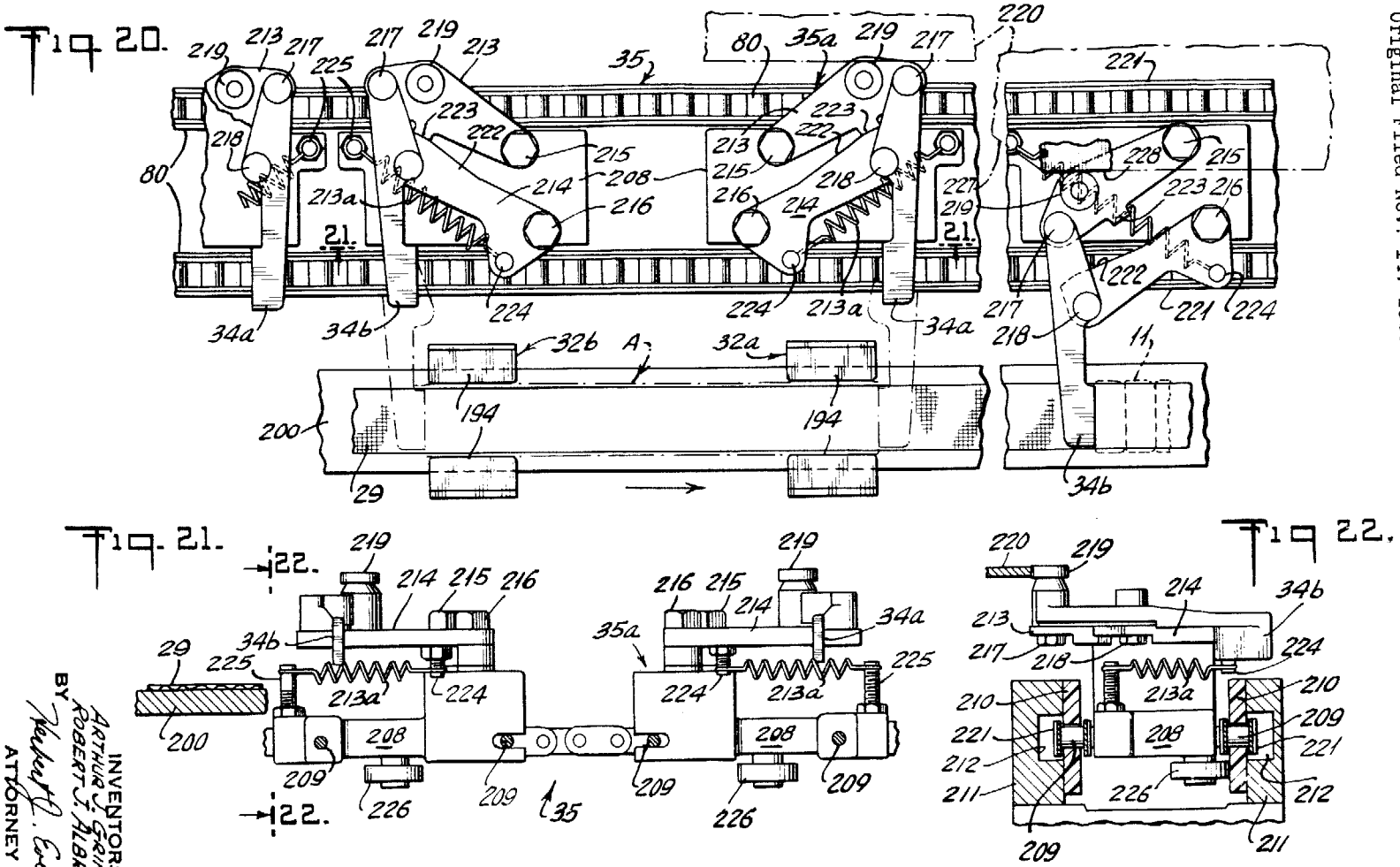
FIG. 20 is an enlarged fragmentary plan view taken along line 20—20 of FIG. 2C showing details of the end grippers **34*a* and 34*b***.
FIG. 21 is a sectional view taken along line 21—21 of FIG. 20.
FIG. 22 is a sectional view taken along line 22—22 of FIG. 21.

Rearward retracting movement of the end gripper 34 is limited to the solid outline position shown in the left-hand portion of FIG. 20 at which point the side surface 222 of the arm 214 engages an abutment or stop 223 along the side of arm 213. The cam roller 219 tends to move along the cam surface 220 in response to the action of a coil spring 213a which is connected between a pin 224 secured to the arm 214 and a pin 225 fixed to the body of the carriage 208. In order to reduce or minimize the wear of the chain against the plate 210, the lower surface of the carriage 208 is provided with a roller 226 which rides along the inside surface of the plate 210, see FIG. 22. The end grippers 34 are comprised of two sets of grippers, a front end gripper element 34a and a rear end gripper element 34b, which are oppositely mounted on the carriage 208, with cam rollers 219 thereof running along the same camming surface 220. If desired however, separate camming surfaces may be provided for the front and rear end gripper cam rollers.

As previously stated, in coodination with the sequential release of the front and rear side grippers 32a and 32b, the end grippers 34a and 34b are respectively sequentially inserted in front of the leading fig bar and behind the last fig bar to retain the metered unit in assembly. This occurs when the end gripper cam followers 219 ride along the section 227, FIG. 25, of the cam 220. At this point, the end grippers 34a, 34b are insertably urged into end engagement with the metered unit which travels along a horizontally spaced parallel course to the metered unit, as clearly shown in both FIGS. 20 and 25.

The metered unit is now held by its respective end grippers 34 which advance the metered unit into the path of the continuous web 38 of packaging material which then commences to surround three sides of the metered unit. During the application of wrapper material about the metered unit, the end gripper cam follower 219 follows the straight section 228 of the cam 220.

Figure 23:
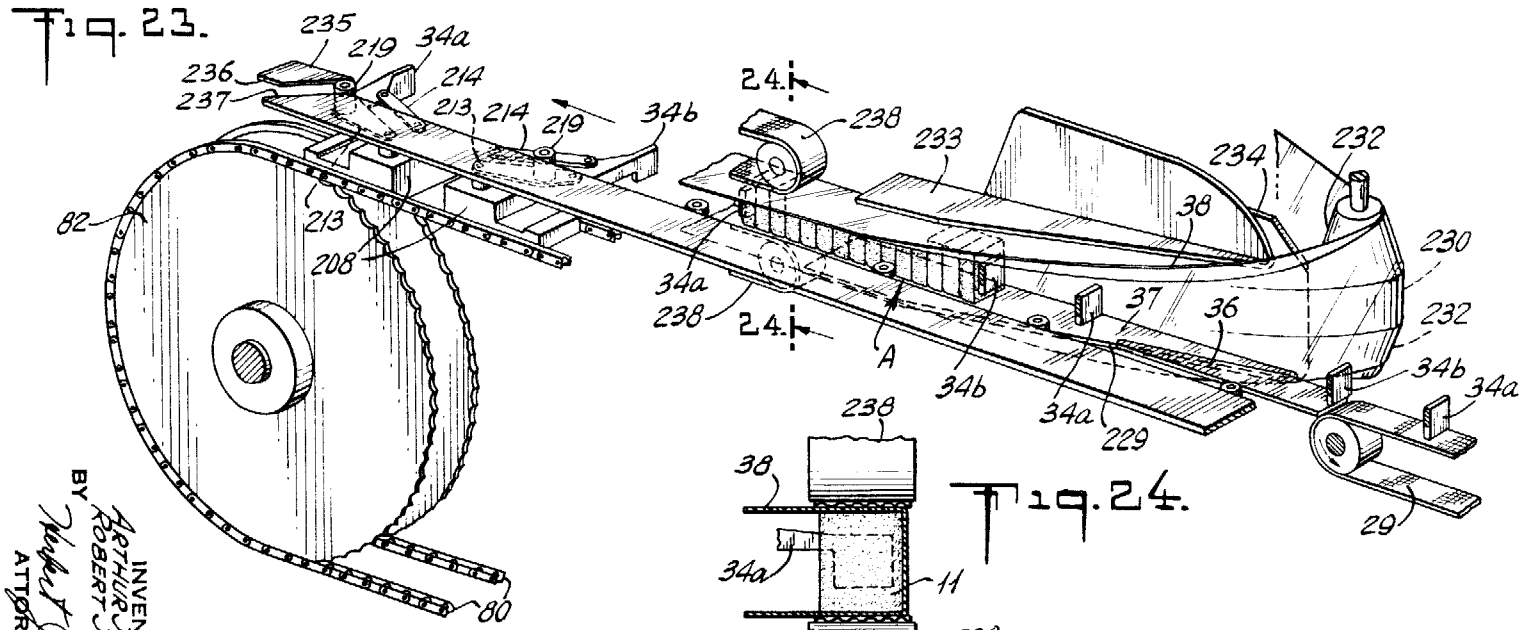
FIG. 23 is a perspective view of the rear end or packaging end of the machine as viewed in a direction opposite to that shown in FIG. 1B in order to more clearly illustrate the parts thereof.

FIGS. 23 and 25 depict the general arrangement of the cam 220 with respect to the conveyor belt 29 and the wrapping station, in which the general direction of advance is depicted as being from right to left in order to more clearly illustrate the operation. At this stage, the metered unit is conveyed by the end grippers 34 past the conveyor belt 29 on to the former plates 36, 37 which are so formed and spaced with respect to each other as to define a diagonal slot 229. An end of the wrapping material is unwound from a roll (not shown) and fed around an idler having a center portion 230 of generally cylindrical shape and an upper and lower portion 232 of generally conical shape in order to precrease the web 38. The upper portion of the web 38 is drawn beneath a horizontal upper former plate 233, the center portion of the web against the inside surface of a vertical side plate 234, and the lower portion of the web is drawn beneath the former plate 36, through the slot 229 and over the former plate 37.

Figure 24:
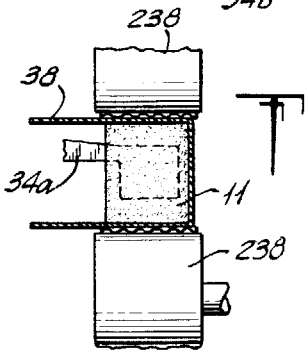
FIG. 24 is a sectional view taken along line 24—24 of FIG. 23.

As shown in the detail view of FIG. 24, the web 38 envelops three sides of the metered unit as it progresses along the former plate 37. The end grippers 34a and 34b move the metered unit along with the progressively forming wrapper without interference with the formation of such wrapper, since the grippers extend through the open side of the wrapper. As the cam followers 219 follow the receding section 237 of the cam 220, the end grippers 34a and 34b are successively withdrawn through the open side of the wrapper thereby enabling the folding of the wrapper to be completed by conventional means, not shown.

Although the spring 231 will retract the end gripper 34 as the cam follower 219 passes section 237, additional camming means for such retraction may be provided. This may comprise an offset guide bar 235 in spaced and parallel relation to the cam 220 which serves to cammingly urge the cam follower 219 into engagement with the cam section 237 and thereafter causes the cam follower to follow the rear surface 236 of the guide bar. The guide bar 235 follows the general path of chain 80 and returns the end grippers to its starting point so that the end gripper action may be repeated on successive metered units.

Prior to the retraction of the end grippers 34, the web of wrapping material and the metered unit are held together and carried past the former plate 37 by a belt mechanism 238 which is part of a conventional packaging mechanism. Thereafter, the folding of the web, the sealing and cutting of the web to form individual units, and the insertion of the individually sealed units into cartons may be performed by conventional methods which need not be elaborated herein.

From the foregoing it will be seen that the present invention provides an improved apparatus and a method of metering articles flowing along a conveying line. The method of wrapping articles in accordance with the invention comprises continuously advancing a plurality of columns of said articles, spacing said advancing columns into advancing columns of articles arranged in staggered relation to each other, combining said advancing spaced columns into a single advancing column and metering predetermined quantities of said combined column in spaced packageable groups, and advancing a continuous web of flexible wrapping material lengthwise adjacent said groups and progressively folding said web of wrapping material about said groups.

It will be understood that modifications and variations may be effected without departing from the spirit and scope of the invention.

We claim:

1. A feed control mechanism for a conveyor unit including a frame and a conveyor on the frame adapted to support and advance a plurality of spaced rows of articles, which comprises a platform in receiving relation to said conveyor for receiving said rows of articles, means for arresting the forward travel of said articles on said platform in stacked rows, said arresting means comprising a plate in abutment with the lead articles in each of said stacked rows, a plurality of slots in said plate in respectively spaced registry with said stacked rows, and a plurality of rows of conveyor flights extending respectively through said slots in the general direction of said stacked rows, said conveyor flights being staggered in stepped relation to one another whereby each lead article in said arrested rows is recurringly successively engaged and segregated therefrom in staggered relation, said segregation of the arrested articles being timed to impart a predetermined spacing therebetween.

2. A feed control mechanism according to claim 1, and stop means adjacent the juncture of said platform and said arresting means operative to prevent more than one article at a time from being segregated from said arrested rows.

3. A feed control mechanism according to claim 2, said stop means being rigid with said frame and extending transversely across said arrested rows, and disposed in sufficiently spaced relation to said plate to allow the passage of segregated articles of varying thickness yet limiting the successive segregations to one article at a time.

4. Apparatus for conveying objects of varying width comprising a longitudinal plate having a plurality of spaced longitudinal slots therein extending from one end of said plate and terminating at a spaced distance from the other end of said plate, a lower conveyor having a plurality of flights disposed below said plate and in vertical alignment with said slots respectively, an upper conveyor having a plurality of flights disposed above said plate parallel to said other end thereof and in overlapping relationship with said lower conveyor, a plurality of fingers mounted on the flights of said lower conveyor and extending through said slots and movable therethrough to engagingly slide objects along said plate, a plurality of fingers on the flights of said upper conveyor arranged to move in registry with the flights on said lower conveyor, said lower flight fingers being operative to recede beneath said plate prior to reaching the termination of said slots, and said upper fingers being operative to engage said objects while said lower flight fingers recede beneath said plate, whereby said objects are conveyed along said plate from one end thereof to the other end thereof at a uniform rate.

5. Apparatus according to claim 4 wherein the fingers of said upper and lower flights are complementarily shaped to engage said objects at the same time without interfering with one another.

6. In a machine for conveying a plurality of rows of articles into a single row, an article receiving drum having plurality of angularly spaced transversely disposed pockets in the peripheral surface thereof, means for rotating said drum, means for delivering into successive pockets of said drum individual articles from said plurality of rows of articles arranged in staggered form, a plurality of push plates mounted on said drum and [associated] *each associated* respectively with a group of said pockets [in] *for* longitudinal movement therein, a fixed unitary cam drum concentric with said rotating drum and comprising an advancing and retracting cam for said push plates, whereby during rotation of said drum said push plates inter-engage the articles residing in said pockets and slide them into a single row.

7. In a machine forming a single row of articles from a plurality of rows of articles in stepped and staggered relation according to claim 6, and supporting means for said push plates comprising a movable base, a pair of guide rods slidingly supporting said movable base for reciprocating movement in a direction transverse to the direction of rotation of the drum, and a cam roller carried by said moveable base and in engagement with said advancing and retracting cam of said cam drum.

8. A machine for combining a plurality of rows of articles arranged in stepped and staggered relation with respect to one another into a single row of articles according to claim 6, and means to discharge separately from the machine the combined row of articles, said means for discharging comprising a peripheral groove around the circumference of said article receiving drum intersecting said pockets, and a stripper finger mounted adjacent said drum and extending into said groove.

9. Stacker wheel comprising a rotatable, generally cylindrical drum comprising spaced circumferential ribs on said drum extending generally radially outwardly therefrom in a direction generally reverse to the direction of rotation of said drum and defining a plurality of transverse rearwardly facing pockets dividing the circumference of said drum into a plurality of groups of pockets, the ends of said ribs being arranged in stepped relation from one end of said drum, the portion of the ribs adjacent the said one end of said drum having a circumferential groove intersecting said pockets, and a scraping edge adapted to slidingly move across a group of the pockets in contact with the peripheral surface of said space circumferential ribs along an axis parallel to the axis of the drum so as to approach said one end of the drum during the rotation thereof.

[10. A method of metering articles of varying thickness into spaced units containing a pre-selected number of said articles comprising the steps of feeding said articles in a plurality of rows to a stripping station, intermittently and in rotational order, stripping the lead articles from each of said rows of articles to form a plurality of spaced groups of said articles arranged in staggered relation to one another, combining said spaced groups into a single column of spaced groups, and consolidating a series of said groups to form said spaced units.]

[11. A method of metering articles according to claim 10, wherein said group of articles contains as many articles as there are rows being fed to said stripping station, and wherein the stripping step comprises a generally linear movement of said stripped articles and the combining step comprises a rotational movement.]

[12. A method of metering articles according to claim 11 wherein the consolidation of said series of said groups is performed simultaneously with the change of movement of said spaced group from a rotational movement to a linear movement.]

13. In combination with a machine having an article receiving drum provided with a series of groups of angularly spaced transversely disposed pockets in the peripheral surface thereof and a plurality of push plates which are transversely aligned in close fitting registry with the pockets for transverse reciprocation therein as the article receiving drum rotates to combine the articles received in said drum into a single row, a stationary platform [hav- fulcrum and adapted to be inserted into the] *having an extension fitting in a* circumferential slot in the receiving drum and an oscillating finger assembly having fingers pivotally oscillatable about a fixed fulcrum and adapted to be [instrted] *inserted* into the circumferential [groove] *slot* behind the proper number of groups of articles to meter a desired unit of articles without interfering with the progress of the articles approaching the stationary platform.

14. A machine according to claim 13 wherein the oscillating finger assembly comprises a conveyor belt, a pair of sprockets having a connecting bar therebetween, a fixed pivot axis at a point intermediate *the ends of* said [pivot] *connecting* bar for oscillating said sprockets thereabout and cam means operated in synchronization with the rotation of the article receiving drum to insert said fingers into the proper space between groups of articles thereby to meter off the desired number of articles in a given unit.

15. A combination according to claim 13, said oscillating finger assembly being operable to transfer the articles as a metered group from the article receiving drum to the stationary platform for transfer to a side gripper assembly unit.

16. The combination of an article conveyor for conveying rows of articles, a slide plate for receiving and arresting the progress of the said rows or articles, a stripper mechanism for intermittently stripping the leading article from each row on said slide plate to form spaced groups of staggered rows of said articles, a stacker wheel having pockets for individually receiving successive articles in each such spaced groups of articles, means for transferring said spaced groups of articles to said stacker wheel, a peripheral slot in said stacker wheel, a plurality of push plates rotatable with said stacker wheel for combining said spaced groups of staggered articles into spaced groups of columnar articles disposed over said peripheral slot, a stationary platform having a finger extension disposed in said slot for stripping said column of spaced groups of columnar articles from said wheel, a chain-driven finger assembly operated in synchronization with rotation of the stacker wheel for metering a series of said spaced groups of columnar articles into a desired unit and operable to transfer said metered unit along said stationary platform to a side gripper assembly, means for oscillating said finger assembly in cooperation with the movement of said stacker wheel to avoid interference of said finger assembly with the articles on said stacker wheel, a plurality of end grippers for advancing said metered unit following said side grippers, means for releasing side grippers as said end grippers come into operation, means for wrapping material about three sides of said metered unit as it is advanced by said end grippers, means for advancing said wrapped metered unit into a pair of conveyor belts for completion of the wrapping process while said end grippers are simultaneously released.

17. Apparatus for gripping a stacked group of articles disposed on edge in linear arrangement on a moving belt, said apparatus comprising a pair of longitudinally spaced carriages movable in a direction generally parallel to the line of travel of said stacked group of articles, a pair of side gripper pads mounted on each of said carriages and adapted to grip the respective sides of the forward and rear ends of said stacked group of articles, cam means for simultaneously effecting gripping action of said pairs of side gripper pads whereby said pairs of side gripper pads retain said group of articles in assembly during transit along said moving belt.

18. Apparatus according to claim 17, and spring means disposed between each of said pairs of side gripper pads and operating in conjunction with said cam means to effect closure of said gripper pads on opposite sides of said stacked group of articles.

19. Apparatus according to claim 18, and stop means limiting the closing movement of said gripper pads.

20. Apparatus according to claim 17, said cam means comprising a pair of cam tracks for said forward and rear gripper pads respectively, said cam tracks being so constructed and arranged as to effect simultaneous closure of said forward and rear gripper pads and opening of same sequentially.

21. Apparatus for the handling of a succession of spaced groups of metered and stacked articles disposed on edge in linear arrangement comprising a moving belt adapted to receive said metered and stacked articles, a plurality of uniformly spaced fingers for pushing said metered and stacked articles onto said moving belt, a pair of longitudinally spaced carriages movable generally parallel to said stacked articles, a pair of side grippers mounted on each of said carriages and adapted to grip the sides of the respective forward and rear ends of said stacked articles, and cam means for simultaneously closing said pairs of side grippers into gripping position.

22. Apparatus according to claim 21, said carriages having a rate of speed different from said belt whereby during gripping of each of said stacked groups by said side grippers the space between said stacked [articles] *groups* is changed.

23. Apparatus according to claim 20, and a pair of end grippers spaced laterally from said stacked group of articles, and a cam track for said end grippers to move said end grippers into gripping relation with the forward and rear ends of said stacked and metered articles in coordination with the respective sequential release of said side gripper pads.

[24. A method of packaging articles which comprises continuously advancing a plurality of columns of articles, spacing said plurality of advancing columns of articles in staggered relation and combining same into a single advancing column, dividing said single advancing column into a plurality of shorter groups to form an advancing column of packageable units, and continuously folding a web of flexible material about said advancing units to provide a wrapper therefor.]

*25. A machine for handling flat articles comprising a rotatable drum member having a plurality of axially extending, circumferentially spaced steps extending about the periphery of said drum member, each of said steps being adapted to receive and support said articles; pusher means on each of said steps operable to engage articles thereon and push them axially of said drum member; and means connected to said pusher means for operating the latter.*

*26. The machine as set forth in claim 25 wherein the operating means includes cam means on each of said pusher means.*

*27. The machine as set forth in claim 26 including fixed guide means engageable with said cam means for guiding the latter.*

*28. The machine as set forth in claim 25 wherein the means for operating the pusher means includes cam means and cam follower means on said pusher means.*

*29. A machine for stacking a series of substantially identical flat articles initially in a number of rows or lanes arranged side by side, the machine comprising a moving conveyor for receiving the articles in their lanes spaced apart across the conveyor and moving each article to a predetermined advanced position in its lane, a device above each lane for engaging the articles in each lane when the same are delivered to said advanced position by said conveyor and further advancing said articles in the lanes, the devices being so coordinated that successively engaged articles are spaced apart at predetermined intervals along the direction of advance, a curved moving conveying surface onto which the articles are transferred by said devices, said surface extending, at the transfer point, substantially in line with the plane of movement of the articles by said devices and thereafter turning downwards until it is nearly vertical and the surface being formed with steps at intervals along its direction of movement and moving at a speed such that one article is deposited on each step, means for moving the articles in a number of lanes laterally so that the articles on successive steps are aligned in the direction of movement of the surface, and at least one stationary member which the steps pass in succession and on which each article is deposited, the face of each step moving the previously deposited articles forward to leave a space for the next article so that the articles are assembled on said member in a stack.*

*30. In a machine for collating generally identical flat articles from a plurality of columns into a single column, a rotating drum having a series of axially extending steps at intervals around the peripheral surface thereof, conveyor means adjacent said drum for delivering lead articles to said drum from said columns in rotational order, said conveyor means and said drum being so coordinated that an article in a said column is deposited on each step by the conveyor means, pusher means mounted on said drum for engaging articles deposited on said steps, cam means for moving said pusher means along said steps to align said articles into a single column, and means for stripping said single column of articles from said steps by interrupting downward movement thereof with the drum.*

*31. A method of packaging flat articles which comprises advancing a plurality of columns of said articles stacked on edge, and automatically recurringly advancing and spacing lead articles in said plurality of columns in staggered relation lying flat and combining the same into a single advancing column of articles stacked on edge.*

*32. A method as defined in claim 31 including the step of automatically dividing said single advancing column into a plurality of spaced groups of articles stacked on edge to form an advancing column of packageable units.*

*33. A machine for handling articles arranged initially in a plurality of rows, the machine comprising a stationary platform, lower conveyor means having spaced flights thereon for recurringly removing the lead article from each of said rows onto said platform, and upper conveyor means having spaced flights for each row for engaging and advancing said articles along said platform, the flights on the upper conveyor means being so coordinated that articles successively engaged thereby are spaced apart at predetermined intervals along the direction of advance and the flights on the lower conveyor means being staggered transversely of the latter in stepped relation to one another, whereby the lead articles in said rows are recurringly successively removed therefrom in staggered and predetermined spaced relation in the direction of movement.*

*34. A machine for handling articles arranged initially in a plurality of rows, the machine comprising a stationary platform, lower conveyor means having spaced flights thereon for recurringly removing the lead article from each of said rows onto said platform, upper conveyor means having spaced flights for each row for engaging and advancing said articles along said platform, the flights on the upper conveyor means being so coordinated that articles successively engaged thereby are spaced apart at predetermined intervals along the direction of advance, an article receiving drum having a plurality of circumferen-*

*tially spaced, transversely extending steps in the peripheral surface thereof, means for rotating said drum, the delivery end of said platform being adjacent the periphery of the drum, whereby articles from each of said rows are successively transferred by said upper conveyor means from the platform to successive steps on said drum as the latter rotates, and means for moving the articles transversely of the drum along said steps and into aligned relation in a plane normal to the axis of the drum.*

*35. In a machine for combining articles from a plurality of rows thereof into a single row, an article receiving drum having circumferentially spaced, transversely extending steps in the peripheral surface thereof, means for rotating said drum, means for recurringly delivering articles successively from said rows onto successive steps on said drum as the latter is rotated, and means for moving the articles transversely of the drum along said steps to align the articles thereon in a single row in the direction of movement of the articles by the drum, said last-named means comprising cam actuated push plates mounted on the drum and movable along said step to push the articles thereon.*

*36. A machine as defined in claim 35 comprising a generally horizontal stationary platform positioned above the horizontal plane containing the axis of the drum and having an extension which the steps overlap and pass as the drum rotates and on which the articles are successively deposited in a single row.*

*37. In apparatus for combining articles from a plurality of rows into a single row, an article receiving drum having a plurality of circumferentially spaced, transversely extending steps in the peripheral surface thereof, means for rotating said drum, means for transferring lead articles from each of said row in recurring succession onto different successive steps on said drum as the latter rotates, means for moving the articles transversely of the drum along said steps and into aligned relation in a single row, means for receiving said articles from the drum in stacked relation in a single row, means for dividing said single row of articles into segregated groups as the same are discharged from the drum, said last-named means comprising endless conveyor means having spaced flight fingers mounted to enter said row behind each said group, and oscillating support means for said endless conveyor means for accelerating the movement of each said flight finger as the latter moves into said row between said groups.*

*38. Apparatus as defined in claim 37 wherein said means for receiving said articles from the drum includes a stationary member extending into a circumferential groove in the stepped surface of the drum in alignment with said single row of articles.*

*39. Apparatus as defined in claim 37 comprising means for driving said endless conveyor means at a speed sufficient to advance each said group relative to the lead article in the following group.*

*40. Apparatus as defined in claim 37 wherein said endless conveyor means comprises an endless chain and said oscillating support means comprises a pivoted member and a pair of spaced idler sprockets mounted on said member for rotation relative thereto and oscillation therewith.*

*41. In apparatus for combining articles from a plurality of rows into a single row, a stacker wheel comprising a rotatable, generally cylindrical drum having circumferentially spaced, transversely extending ribs projecting radially therefrom, said ribs having surfaces facing in a direction generally opposite to the direction of rotation of the drum and defining a plurality of rearwardly facing steps for receiving lead articles in said rows, and pusher members mounted on the drum for reciprocating movement along said steps as the drum rotates to slide articles on successive steps into single row alignment.*

*42. Apparatus as defined in claim 41 comprising means responsive to the rotation of the drum for reciprocating said pusher members in timed relation to the rotation of the drum.*

*43. In apparatus adapted for segregating groups of articles in an advancing column, conveyor means comprising an endless chain, spaced flight fingers mounted on said chain for limited pivotal movement relative thereto and projecting generally at right angles thereto, support means for said chain including a sprocket for driving said chain at a constant speed, a pivoted member and spaced idler sprockets mounted on said member for rotation relative thereto and oscillation therewith, and means for oscillating said member about its pivot.*

*44. Apparatus as defined in claim 43 wherein said last-named means includes cam means for actuating said member when a said flight finger is passing around one of said idler sprockets.*

*45. Apparatus as defined in claim 43 wherein each of said flight fingers is generally in the form of a Y, one arm of which is pivotally connected to the chain and another arm of which is connected to the chain by a pin and slot connection.*

References Cited

The following references, cited by the Examiner, are of record in the patented file of this patent or the original patent.

UNITED STATES PATENTS

| | | | |
|---|---|---|---|
| 1,824,414 | 9/1931 | Stein | 198—32 X |
| 2,555,816 | 6/1951 | Rhodes et al. | 198—34 X |
| 2,597,415 | 4/1952 | Watson | 198—20 |
| 3,036,581 | 5/1962 | Dearsley | 198—32 X |
| 2,829,476 | 4/1958 | Engleson et al. | 53—159 |
| 2,857,721 | 10/1958 | Arnell. | |

WILLIAM W. DYER, Jr., *Primary Examiner.*

TRAVIS S. McGEHEE, *Examiner.*

R. ALVEY, *Assistant Examiner.*